United States Patent [19]

Sako

[11] Patent Number: 5,757,752
[45] Date of Patent: May 26, 1998

[54] METHOD FOR RECORDING/ REPRODUCING DATA WITH A PLURALITY OF SECTOR FORMATS ON RECORD MEDIUM AND APPARATUS THEREOF

[75] Inventor: Yoichiro Sako, Chiba, Japan

[73] Assignee: Sony Corporation, Tokyo, Japan

[21] Appl. No.: 666,670

[22] Filed: Jun. 18, 1996

[30] Foreign Application Priority Data

Jun. 20, 1995 [JP] Japan ................................. 7-176816
Jun. 23, 1995 [JP] Japan ................................. 7-180954

[51] Int. Cl.$^6$ ............................................. G11B 7/00
[52] U.S. Cl. .................. 369/59; 369/58; 369/47; 369/275.3
[58] Field of Search ..................... 369/59, 60, 47, 369/48, 49, 50, 54, 58, 275.3, 32

[56] References Cited

U.S. PATENT DOCUMENTS 5,327,406  7/1994  Sako .......................... 369/32

FOREIGN PATENT DOCUMENTS

0506103 A2  9/1992  European Pat. Off. .
0507341 A2  10/1992  European Pat. Off. .

*Primary Examiner*—Muhammad N. Edun
*Attorney, Agent, or Firm*—Limbach & Limbach L.L.P.

[57] ABSTRACT

A data recording apparatus for recording digital data on a data record medium is disclosed, that comprises an input for receiving first data of which data is divided by a length of a multiple of 512 bytes and second data of which data is divided by a byte length corresponding to a CD format, a formatting circuit for converting each of the first data and the second data into a sector format, an encoding circuit for error-correction-code encoding output data of the formatting circuit, a modulating circuit for digitally modulating the data that has been error-correction-code encoded, and a recording circuit for recording record data supplied from the modulating circuit to the data record medium.

34 Claims, 20 Drawing Sheets

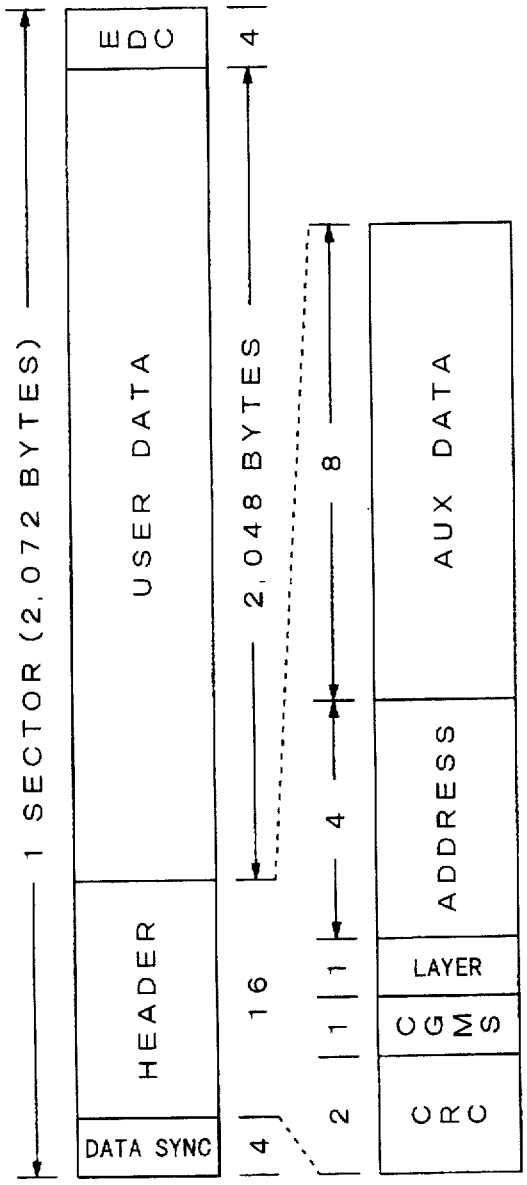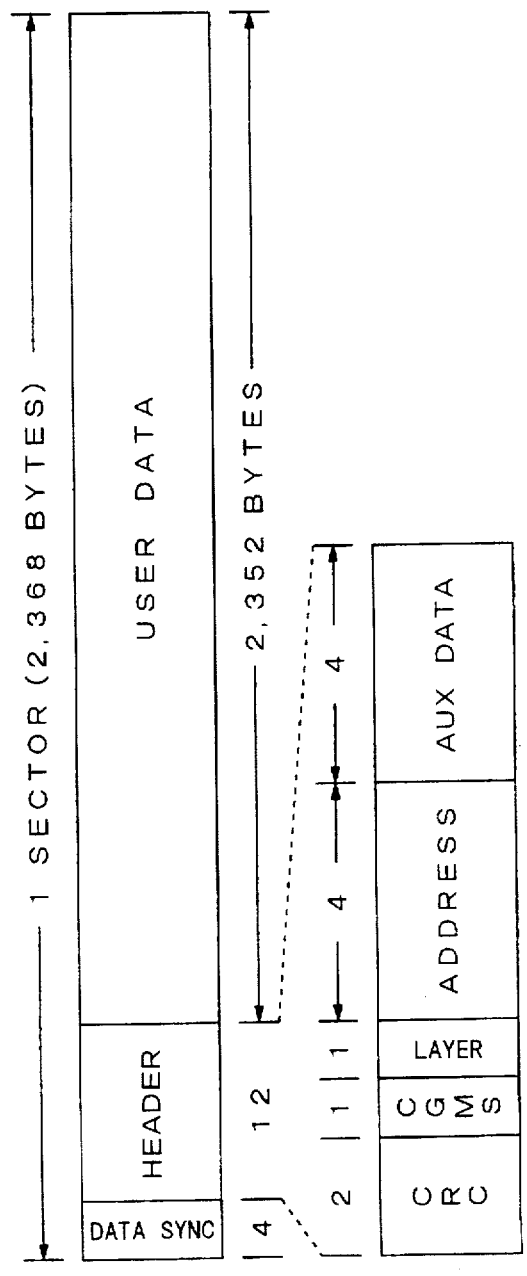
Fig. 6A  Fig. 6B  Fig. 7A  Fig. 7B

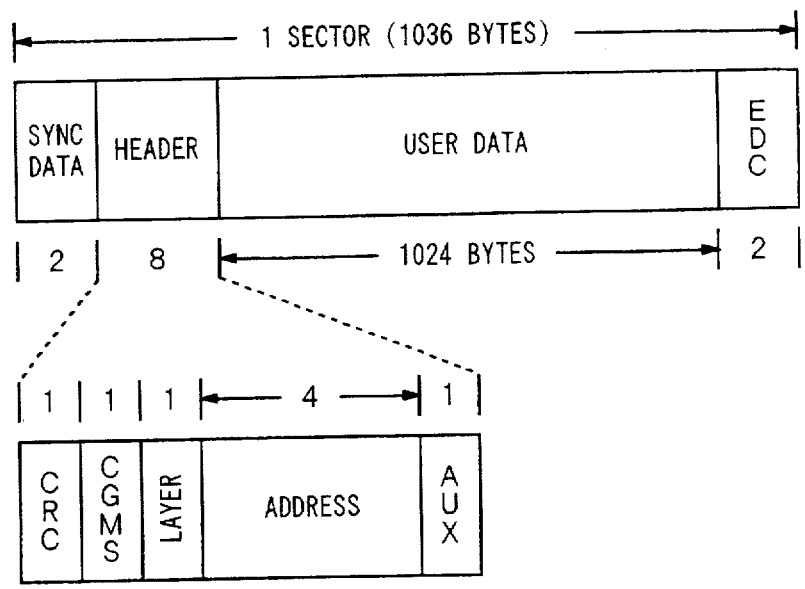
Fig. 10A
Fig. 10B
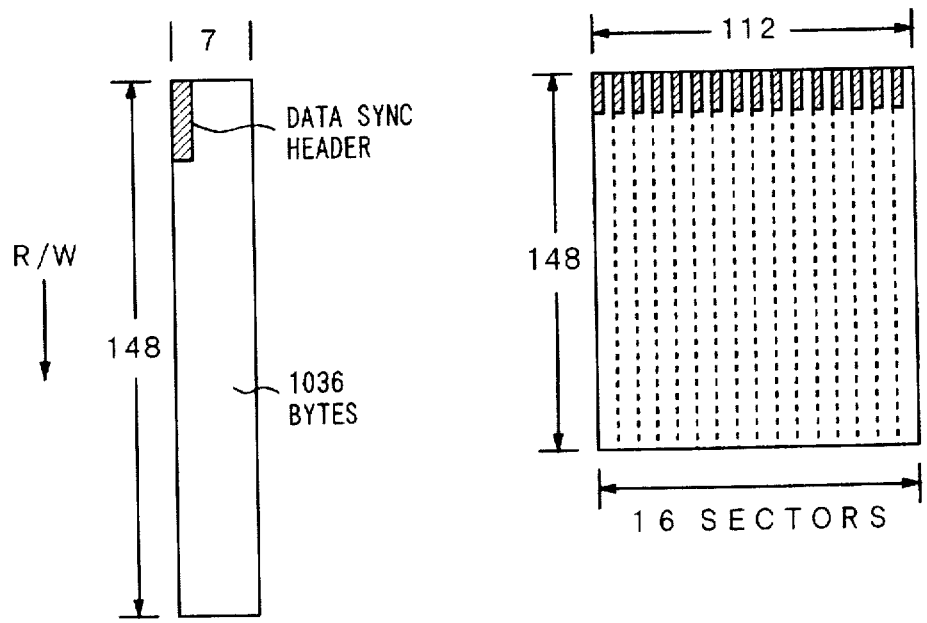
Fig. 11

METHOD FOR RECORDING/ REPRODUCING DATA WITH A PLURALITY OF SECTOR FORMATS ON RECORD MEDIUM AND APPARATUS THEREOF

BACKGROUND OF THE INVENTION

1. Field of the Invention

The present invention relates to a data recording/ reproducing apparatus for simplifying a signal process between a particular data record medium with a particular format and another data record medium with another format, in particular, between a particular data record medium with a particular sector size and another data record medium with another sector size and a data record medium thereof.

2. Description of Related Art

As external storing units for use with computers, from the view points of large storage capacity and high speed access, optical disc drives are becoming popular. CD-ROM (or CD-I (CD interactive)) drives and MO (magneto-optical disc) drives have been rapidly and widely used. An MO disc is one type of erasable disc. In addition, an MD (mini-disc) that is an erasable type disc has been proposed. Moreover, as a picture record medium, a DVD (digital video disc) is now under development.

The DVD is a reproduction-only disc with the same diameter as the diameter of the CD or a recordable/ reproducible optical disc that is an MO type disc or a phase change type disc that reproduces or records/reproduces picture information compressed corresponding to the MPEG standard or the like. As the wavelength of laser rays decreases and the numerical aperture (NA) of an objective lens increases, the digital modulation and the error correction code encoding process have been improved and thereby the recording density has been further improved. In the case that the DVD is a single layer type disc, the data storage capacity is as much as around 3.7 Gbytes. The CD and MD were originally developed for digital audio discs. Thereafter, these discs have been used for external storage mediums for computers. Likewise, the DVD with a much larger storage capacity than the CD and MD is expected to be used for external storage mediums for computers.

Conventionally, individual mediums such as a magnetic tape, a magnetic disc, a flexible disc, and the above-described optical disc have respective predetermined formats. In other words, these mediums were developed without considering their compatibility. The compatibility between the format of a newly developed medium and the format of a conventional medium is only logically available, not effectively. For example, the sector size of external storage mediums for use with computers is mainly 128 bytes×$^i$ (where i is any integer), for example, 512 bytes and 2,048 bytes (2 kbytes). On the other hand, the sector size of a CD-ROM is 2,352 bytes (when a synchronous signal is excluded, the sector size thereof is 2,340 bytes; when both a synchronous signal and a header are excluded, the sector size thereof is 2,336 bytes). Thus, since the format of the external storage mediums does not physically accord with the format of the CD-ROM, it is difficult to have the compatibility between them.

The above-described DVD can be accomplished by a read-only disc (such as a CD), a recordable MO disc, or a phase change type disc. The storage capacity of these discs is advantageously much larger than that of existing optical discs. When the DVD is newly used as an external storage medium, considering the compatibility between the format of the DVD and the format of the CD-ROM, which has been widely used and standardized in the disc size and reading method, data can be easily exchanged between the CD-ROM and the DVD. Thus, the same drive can be used for both the CD-ROM and the DVD. In addition, the resources of CD-ROMs can be effectively used.

OBJECT AND SUMMARY OF THE INVENTION

An object of the present invention is to provide a data recording/reproducing apparatus for handling both a sector format with a data length of a multiple of 512 bytes and another sector format with a byte length corresponding to the CD format, a method thereof, and a disc medium thereof.

A first aspect of the present invention is a data recording apparatus for recording digital data on a data record medium, comprising an input means for receiving first data of which data is divided by a length of a multiple of 512 bytes and second data of which data is divided by a byte length corresponding to a CD format, a formatting means for converting each of the first data and the second data into a sector format, an encoding means for error-correction-code encoding output data of the formatting means, a modulating means for digitally modulating the data that has been error-correction-code encoded, and a recording means for recording record data supplied from the modulating means to the data record medium.

A second aspect of the present invention is a data reproducing apparatus for reproducing data from a data record medium, the data having been recorded on the data record medium in such a manner that first data divided by a length of a multiple of 512 bytes and second data divided by a byte length corresponding to a CD format are converted into respective sector formats and that an error-correction-code encoding process and a digital modulating process are performed for the sector formatted data, the apparatus comprising a means for reproducing the data from the data record medium, a means for digitally demodulating the reproduced data, decoding means for correcting an error of the demodulated data, a deformatting means for extracting the first data and the second data from the error-corrected data, and a means for selectively sending the first data or the second data.

A third aspect of the present invention is a method for recording digital data on a data record medium, comprising the steps of receiving first data divided by a length of a multiple of 512 bytes or second data divided by a byte length corresponding to a CD format, formatting the received data as sectors composed of the first data or the second data, block segmenting a plurality of sectors composed of the first data or the second data, adding an error correction parity to data as each of the blocks so as to encode the data, digitally modulating the encoded data, and recording the modulated data on the data record medium.

A fourth aspect of the present invention is a disc-shaped data record medium for recording first sectors composed of first data divided by a length of a multiple of 512 bytes or second sectors composed of second data divided by a byte length corresponding to a CD format, an error-correction-code encoding process and a digital modulating process having been performed for the first sectors or the second sectors, a header being added to each of the first sectors or the second sectors, the header being used for identifying whether the sector containing the header is the first sector or the second sector.

Both a sector format with a data length of a multiple of 512 bytes (for example, 2,048 bytes) and another format with a byte length corresponding to the CD format (for example, 2,352 bytes) can be handled with physical regions. Thus, computer storage data and CD-ROM data can be stored on the same record medium.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 6A and 6B are schematic diagrams showing an example of a data structure of a 2 kbyte sector according to an embodiment of the present invention;

FIGS. 7A and 7B are schematic diagrams showing an example of a data structure of a CD sector according to an embodiment of the present invention;

FIGS. 10A and 10B are schematic diagrams showing a data structure of a 1 kbyte sector according to the present invention;

FIG. 11 is a schematic diagram showing a data structure of a block composed of 1 kbyte sectors according to the present invention;

DETAILED DESCRIPTION OF THE PREFERRED EMBODIMENTS

Figure 1:
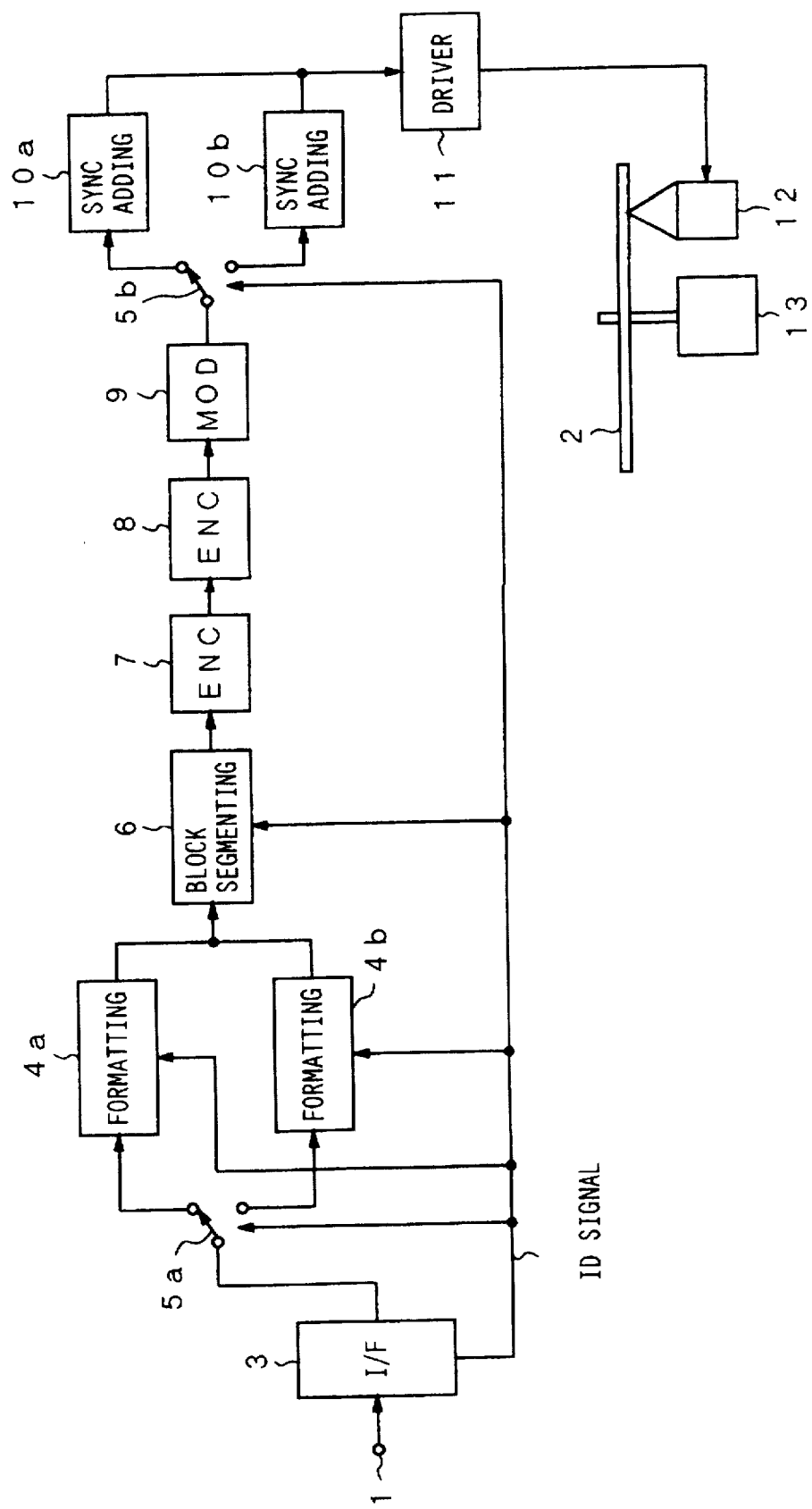
FIG. 1 is a block diagram showing a structure of a recording circuit according to an embodiment of the present invention.
Figure 2:
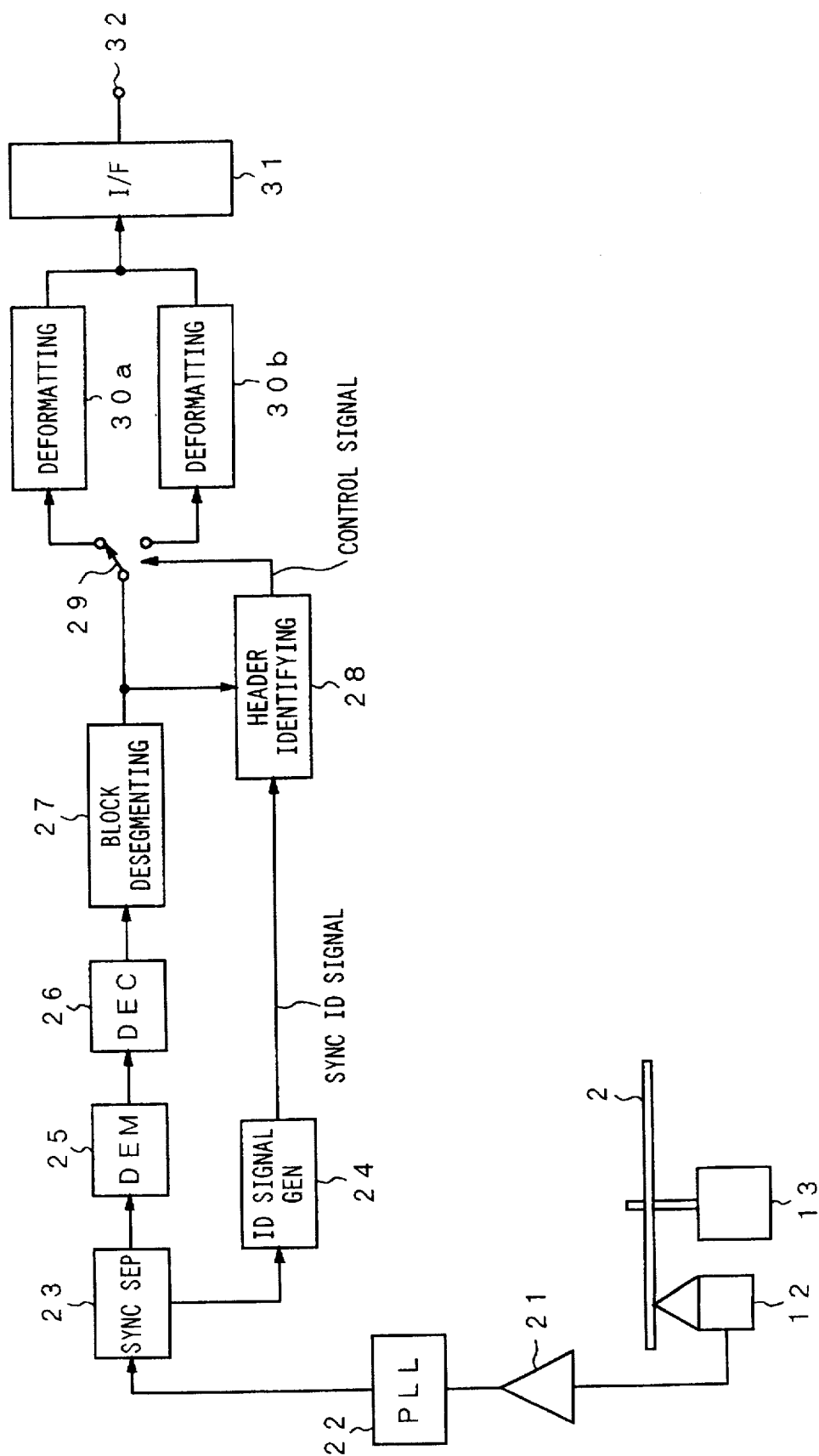
FIG. 2 is a block diagram showing a structure of a reproducing circuit according to an embodiment of the present invention.

Next, with reference to the accompanying drawings, an embodiment of the present invention will be described. FIG. 1 shows a structure of an optical disc recording system according to the present invention. FIG. 2 shows a structure of an optical disc reproducing system according to the present invention. In the recording system, data to be recorded (hereinafter referred to as record data) is supplied from an input terminal 1. The record data is recorded on an optical disc 2. The record data is composed of compressed video data, compressed audio data, computer data, and so forth. The currently proposed recordable types of DVDs (namely, magneto-optical type and phase change type) are examples of the optical disc 2. It should be noted that the recording system shown in FIG. 1 can be applied for a mastering system of a read-only disc as well as the recordable optical disc 2.

Figure 3:
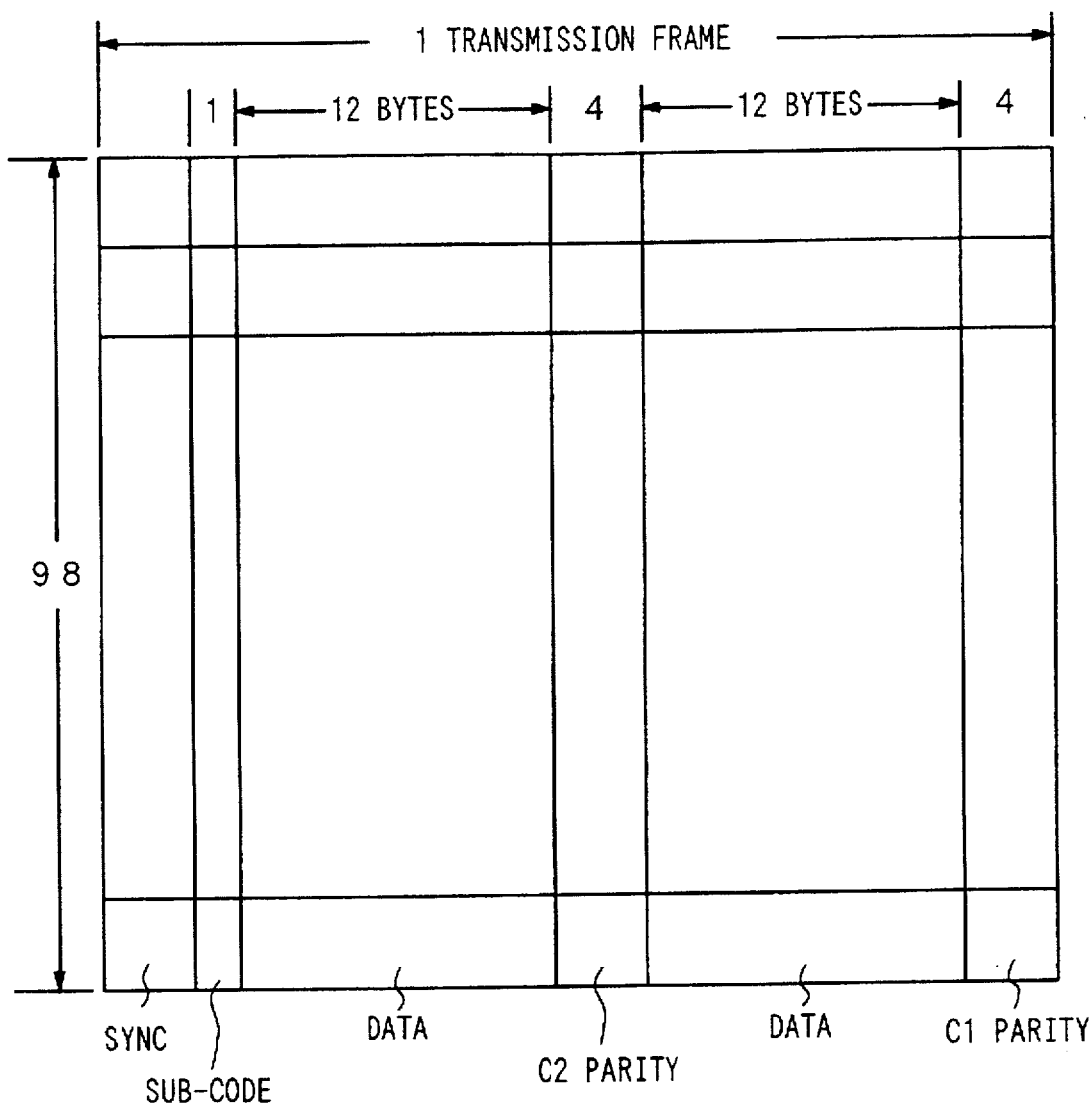
FIG. 3 is a schematic diagram for explaining a data structure of a conventional CD.

Next, the data structure of the optical disc 2 according to the present invention will be described. First of all, a sector format of CD-ROM data will be explained. The CD-ROM was evolved from a known CD. As shown in FIG. 3, each transmission frame (sometimes referred to as an EFM frame or a C1 frame) of a CD contains a sub-code of 1 byte, data of 24 bytes, a C1 parity of 4 bytes, and a C2 parity of 4 bytes. Each byte of data is converted into a code-word composed of 14 channel-bits by the EFM modulating method and recorded on the CD with connection bits (3 channel-bits). A sync (synchronous signal) is added at the beginning of each transmission frame. Each sync is composed of 24 channel-bits including two sequences of which the interval of inverted channel-bits is 11T (T represents a period of a channel-bit) and two channel-bits preceded thereby.

The sub-code is formed every 98 transmission frames. In the CD-DA (digital audio), user data of 24 bytes×98 (=2, 352) bytes is contained in the 98 transmission frames. When the sub-code is included, user data of 25 bytes×98 (=2,450) bytes is contained in the 98 transmission frames. Thus, the CD-DA has two types of formats that are 2,352 byte format and 2,450 byte format.

Figure 4:
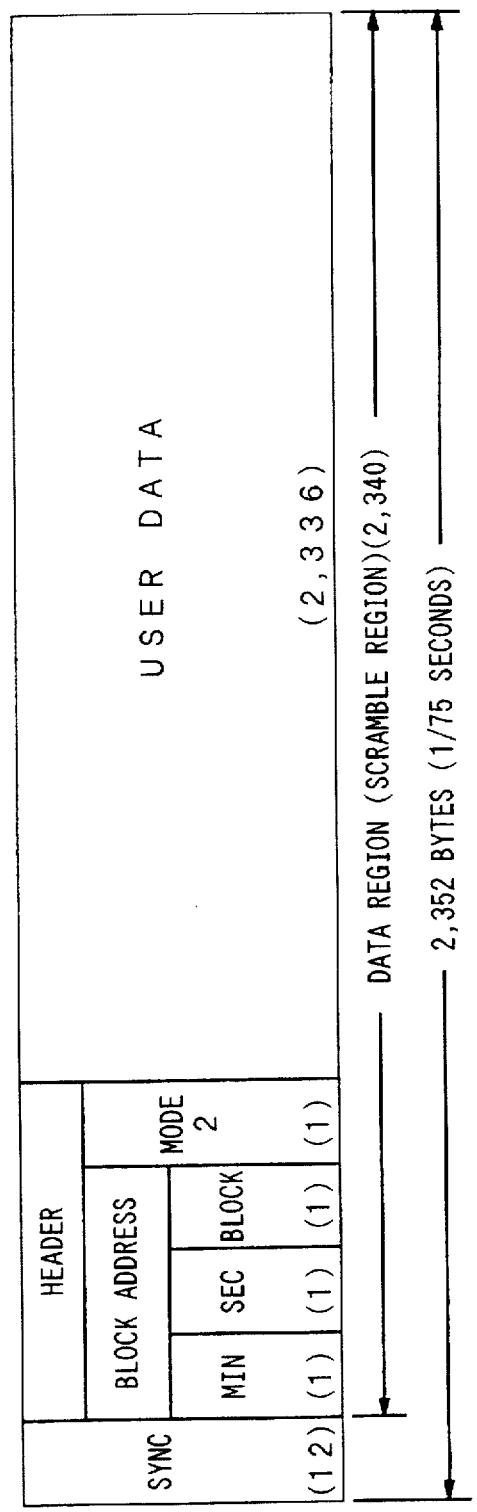
FIG. 4 is a schematic diagram for explaining data structures of a conventional CD-ROM.

The data structure of the CD-ROM is defined corresponding to the transmission format of the CD. In other words, data on the CD-ROM is accessed every 2,352 bytes contained in 98 frames that is an interval of the sub-code as an access unit. This access unit may be referred to as a block. However, in the following description, the access unit is referred to as a sector. FIG. 4 shows data structures of one sector of a CD-ROM.

For the CD-ROM, three modes that are mode 0, mode 1, and mode 2 have been defined. In each of these modes, a synchronous signal (12 bytes) (that represents a delimiter of a sector) and a header (4 bytes) are added. In the mode 0, all data other than the synchronous signal and the header is "0". The mode 0 is used as dummy data. FIG. 4 shows data structures of the modes 1 and 2. As with the sub-code of the CD, the header is composed of address information (3 bytes) and mode information (1 byte).

In the data structure of the mode 1, the user data is composed of 2,048 (2 k) bytes. In addition, auxiliary data of 288 bytes is added so as to improve the error correction performance. The auxiliary data is composed of an error detection code (4 bytes), a space (equivalent to 8 bytes), a P parity (172 bytes), and a Q parity (104 bytes). The mode 1 is suitable for such as computer data that should be recorded with a high reliability. In the mode 2, the auxiliary data of 288 bytes is not added. Thus, user data of 2,336 bytes is recorded. The mode 2 is suitable for such as video data and audio data of which an error can be interpolated.

Figure 5:
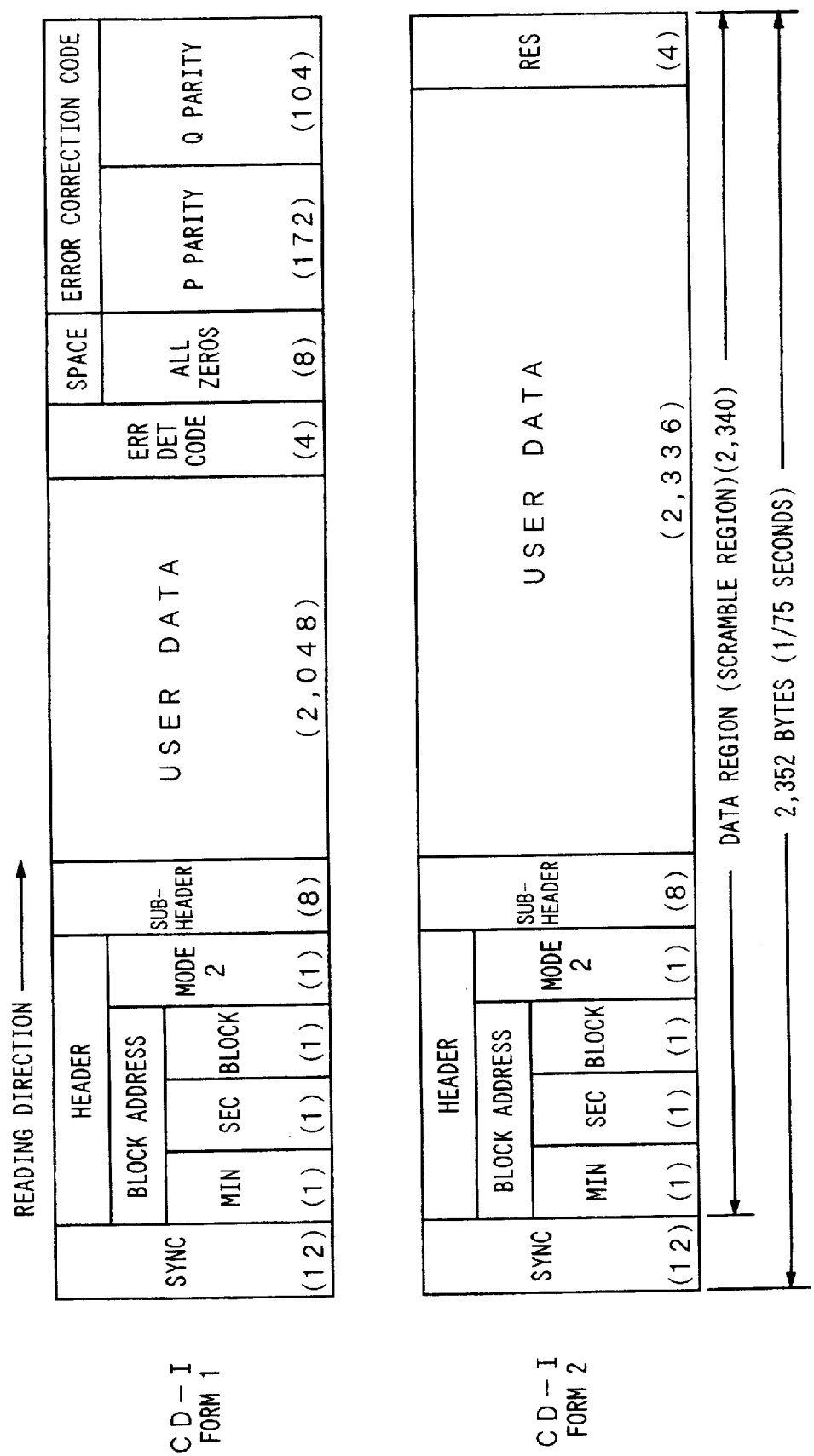
FIG. 5 is a schematic diagram for explaining a data structure of a conventional CD-I.

As a read-only disc that is the same type as the CD-ROM, a CD-I has been standardized. FIG. 5 shows a data structure of one sector of the CD-I. As with the CD-ROM, in the CD-I, a sync (12 bytes) and a header (4 bytes) are added. The mode information of the header is the mode 2. In the CD-I, a sub-header (8 bytes) is added after the header. The sub-header is composed of a file number, a channel number, a sub-mode, and a data type each of which is composed of 2 bytes.

As with the modes 1 and 2 of the CD-ROM, in the CD-I, forms 1 and 2 have been defined. In the form 1, an error detection code (4 bytes), a P parity (172 bytes), and a Q parity (104 bytes) are added. In the form 1, a space is not present unlike with the mode 1 of the CD-ROM. The region of the user data is 2,048 bytes. In the form 2, a reserved region (4 bytes) is formed. Thus, the user data is composed of 2,324 bytes.

As described above, the byte length corresponding to the CD format is based on 2,352 bytes. By controlling the additional data (header, sub-code, and so forth), byte lengths of 2,340 bytes, 2,336 bytes, 2,324 bytes, 2,450 bytes, and so forth are available.

Next, another sector format will be described. As shown in FIG. 6A, a data sync (4 bytes) and a header (16 bytes) are added to user data of one sector (2048 bytes (=2 kbytes)). In addition, an error detection code EDC (4 bytes) is added to improve the reliability. Thus, the length of one sector is 2,072 bytes.

FIG. 6B shows a data structure of the header in detail. The header is composed of an error detection code (namely, CRC) (2 bytes), copy management information (CGMS) (1 byte), a layer (that identifies a single layer disc and a multiple-layered disc and represents a layer number of the layer on which data is recorded) (1 byte), an address (4 bytes), and auxiliary data (AUX) (8 bytes). In this example, an sector ID signal that identifies the sector format is placed in the auxiliary data.

On the other hand, since the data length corresponding to the CD format of the CD-ROM, CD-I, CD-DA, and so forth is for example 2,352 bytes, as shown in FIG. 7A, a data sync (4 bytes) and a header (12 bytes) are added. Thus, the data length of one sector is 2,368 bytes. In the case of the CD-DA, user data of 2,352 bytes is contained in 98 transmission frames. As shown in FIG. 7B, the header is composed of a CRC (2 bytes), copy management information (CGMS) (1 byte), a layer (1 byte), an address (4 bytes), and auxiliary data (4 bytes). The header shown in FIG. 7B is the same as the header shown in FIG. 6B except that the data length of the auxiliary data shown in FIG. 7B is smaller than the data length of the auxiliary data shown in FIG. 6B.

Thus, the data lengths of the sector formats vary corresponding to the types of discs and the relation of the data lengths thereof is not a multiple. In this embodiment, assuming that two sector sizes are A and B, nA and mB become a predetermined block (where $n \neq m$ and $n > m$).

Data is recorded/reproduced (namely, accessed) every block. The primes n and m are defined so that they are relative primes. In particular, when the size of A is close to the size of B, n and m are selected by one of two methods. In the first method, the relation of $m=n-1$ is satisfied. In the second method, the relation of $n=2^j$ (where j is a natural number) is satisfied. The method of which m and n are relatively primes is used when the block size is minimized. The method of which $n=2^j$ is used when data is used for a computer system.

In the above-described example, when n=8 and m=7, the data length of the user data becomes as follows.

2,048 bytes×8=16,384 bytes 2,336 bytes×7=16,352 bytes

Thus, the user data is contained in a block of 16 kbytes (16,384 bytes).

In addition, as described above, in the case that the sector size includes the data sync and the header, since A'=2,072 and B'=2,368, when n=8 and m=7 are selected, the common block size of 2,072×8=2,368×7=16,576 bytes can be defined.

Figure 8:
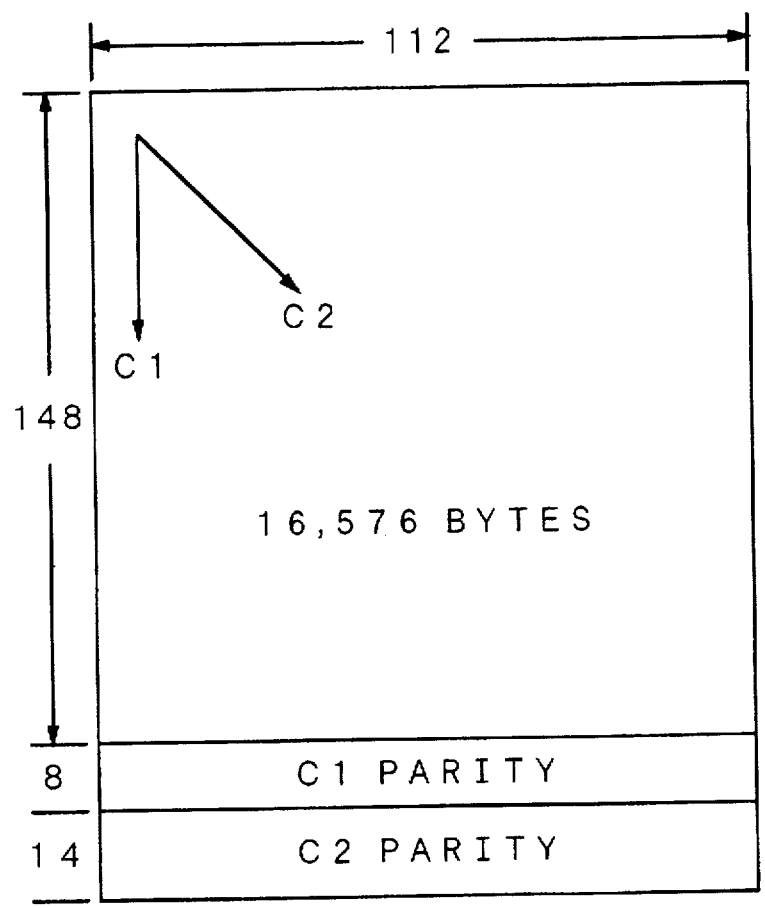
FIG. 8 is a schematic diagram showing a data structure of a block according to an embodiment of the present invention.

As shown in FIG. 8, a two-dimensional array of (148× 112=16,576 bytes) is defined as a data structure of one block. By applying an error correction code encoding process for the two-dimensional array, the error correction performance can be improved. In this example, 162 bytes in the vertical direction (each row) of the two-dimensional array are encoded with a first error correction code (referred to as a C1 code). Thus, a C1 parity of 8 bytes is generated. In addition, 156 bytes in the diagonal direction of the two-dimensional array are encoded with a second error correction code (referred to as a C2 code). Thus, a C2 parity of 14 bytes is generated. This encoding process is referred to as a folding type dual code encoding process.

Besides the folding type dual code encoding process, the product code encoding process, the block-completion-type dual code encoding process, the LDC (long distance code) encoding process, or the like may be used. Alternatively, a simple error detection code encoding process may be used.

Figure 9A:
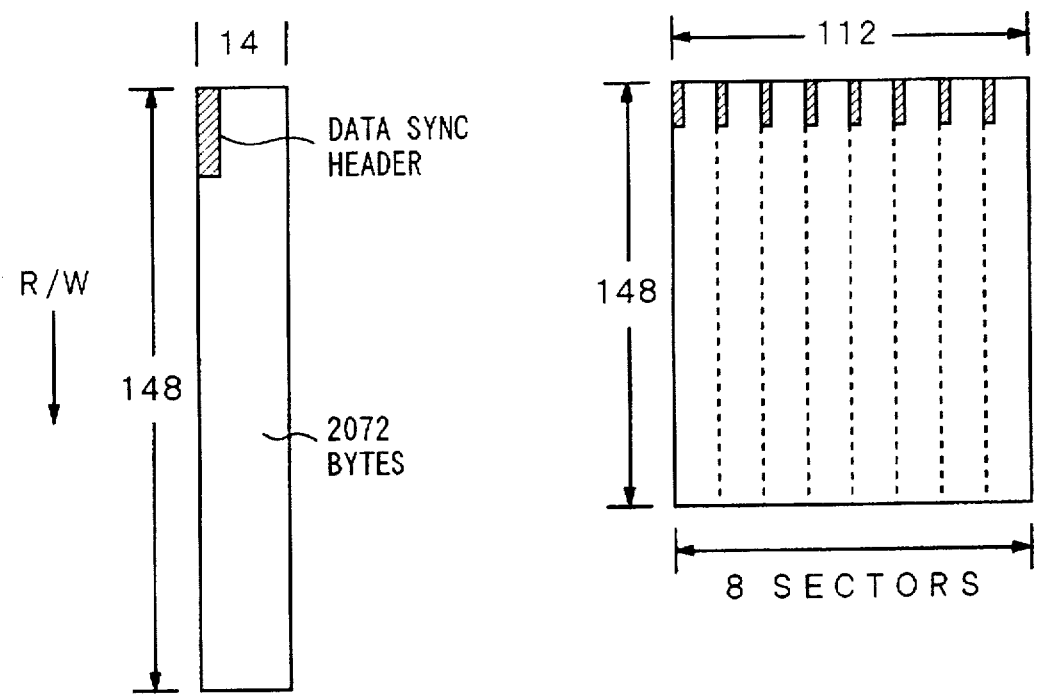
FIGS. 9A and 9B are schematic diagrams showing the relation between sectors and blocks according to an embodiment of the present invention.

Next, with reference to FIGS. 9A and 9B, the case that two sectors with different sizes are unified into a block with the same size will be described. FIG. 9A shows the process of which the sector size shown in FIG. 6A is 2,072 bytes (hereinafter referred to as a 2 kbyte sector). One sector is divided every 148 bytes in the recording/reproducing (R/W) direction. Thus, a two-dimensional array of 148×14=2,072 bytes is formed. Consequently, a data structure of which one block is composed of eight sectors is formed.

Figure 9B:
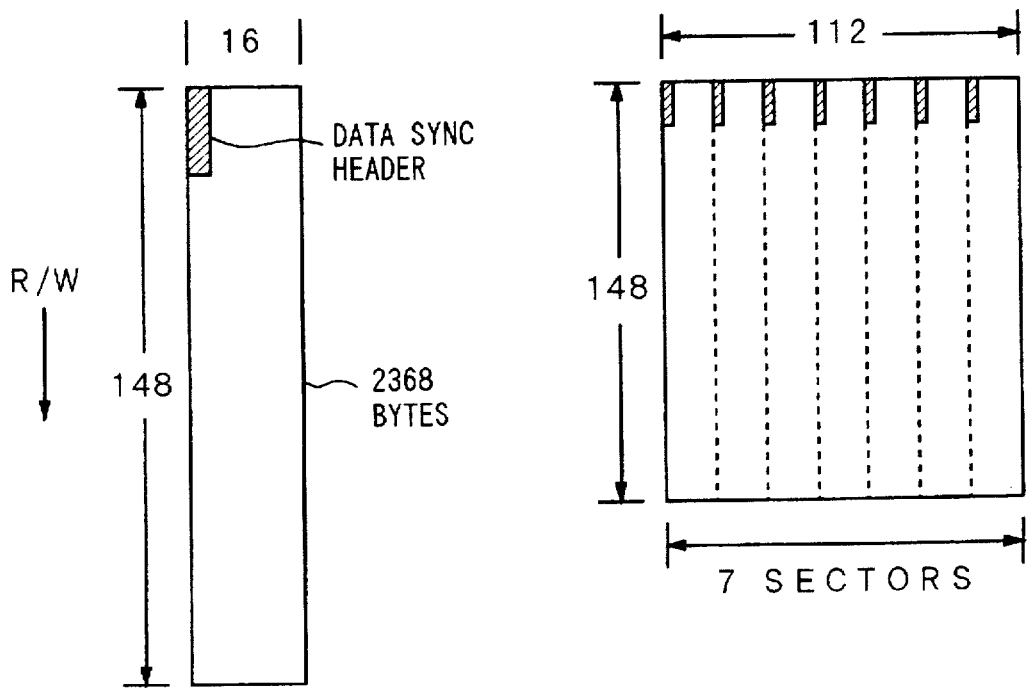

FIG. 9B shows the process in the case that the sector size shown in FIG. 7A is 2,368 bytes (hereinafter referred to as a CD sector). One sector is divided every 148 bytes in the R/W direction. Thus, a two-dimensional array of 148×16= 2,368 bytes is formed. Consequently, a data structure of which one block is composed of seven sectors. When data is recorded/reproduced, frames of 2,072 bytes or 2,368 bytes are counted by a counter. When the counter counts seven or eight sector syncs, it detects a block. Alternatively, a block sync other than a sector sync may be added. Although the block sync is required for the block-completion-type error correction code encoding process, it is not essential in the present invention.

In the above description, one sector of computer data contains data of 2 kbytes. However, one sector may contain data of a multiple of 512 bytes. For example, as shown in FIG. 10A, a sector format that contains data of 512×2=1,024 (=1 k) bytes can be used. The sector contains a data sync (2 bytes), a header (8 bytes), and an error detection code (4 bytes) as well as user data (1,024 bytes). As shown in FIG. 10B, the header is composed of a CRC (that detects a header error) (1 byte), copy management information (CGMS) (1 byte), layer information (1 byte), an address (4 bytes), and auxiliary data (1 byte) that are the same as those shown in FIG. 6B.

Assuming that A=1,024 (=1 k) bytes and A'=1,036 bytes, 1 kbyte sectors can be block segmented with n=16 and m=7. In other words, as shown in FIG. 11, data is divided every 148 bytes in the R/W direction so as to form a two-dimensional array of 148×7=1,036 bytes. One block is composed of 16 sectors.

Returning to FIG. 1, a recording system according to an embodiment of the present invention will be described. Digital data is supplied from an input terminal 1 to a switch circuit 5a through an interface 3 for example a SCSI interface. The switch circuit 5a selectively supplies the digital data to formatting circuits 4a and 4b. The formatting circuits 4a and 4b divide the digital data into sectors and add a data sync and a header to each sector. In other words, the formatting circuit 4a converts the received data into the 2 kbyte sector format shown in FIG. 6A. On the other hand, the formatting circuit 4b converts the received data into the CD sector format shown in FIG. 7A.

The switch circuit 5a is controlled corresponding to an ID signal on a control signal bus of the interface 3. The switch circuit 5a is operated corresponding to data received from the interface 3 through a data bus. When data that has been divided every 2 kbytes is received from a computer, for example the switch circuit 5a selects the formatting circuit 4a corresponding to the ID signal on the control bus. On the other hand, when data that has been divided every 2,352 bytes is received from a CD-ROM drive, for example the switch circuit 5a selects the formatting circuit 4b. The ID signal is supplied to the formatting circuits 4a and 4b. The ID signal or a substitute signal thereof is placed in the header of each sector as part of the auxiliary data. Output data of the formatting circuits 4a and 4b is supplied to a block segmenting circuit 6.

The ID signal may be supplied to a TOC (table of contents) generating circuit (not shown) so as to generate TOC data that contains the ID signal. The TOC data contains disc control information, directory information, and so forth. The TOC data is data recorded on, for example the inner-most peripheral track. When a disc is loaded in a drive, the TOC data is read from the disc. The TOC data may be referred to as DIT (disc information table). Thus, the DIT data is substantially the same as the TOC data.

Alternatively, along with the user data, the TOC data is supplied to the input terminal 1. Thus, the TOC data is converted into a sector format along with the user data. In this case, as the relation between a TOC sector composed of TOC data and a user sector composed of user data, the following three types of structures are available. In a first structure, the TOC sector is a 2 kbyte sector, whereas the user sector is a 2 kbyte sector or a CD sector. In a second structure, both the TOC sector and the user sectors are CD sectors. The second structure is used in such a case that all data of a CD-ROM is recorded on the optical disc 2. In a third structure, the TOC sector is composed of a first TOC sector that is a 2 kbyte sector and a second TOC sector that is a CD sector, whereas the user sector is a CD sector. The third structure is used in such a case that all data of the CD-ROM is recorded and the TOC data of the optical disc 2 (for example, DVD) is formed as a 2 kbyte sector.

The block segmenting circuit 6 forms a block that is composed of seven sectors or eight sectors as shown in FIG. 9A or 9B corresponding to the ID signal added to the header of each sector or an ID signal received from the outside. The output data of the block segmenting circuit 6 is successively supplied to a C2 encoder 7 and a C1 encoder 8 that are error correction code encoders. These encoders perform a folding type dual code error correction code encoding process as shown in FIG. 8. The real process performed by the encoder 8 will be described later.

The output data of the C1 encoder 8 is supplied to a digital modulating circuit 9. The digital modulating circuit 9 maps a data symbol of, for example one byte (eight bits) to a code-word of 16 bits corresponding to a predetermined table so as to generate modulated data with a small DC component. Of course, as the digital modulating method, the EFM method (used for CDs), the 8–15 modulating method (of which a data symbol of eight bits is converted into a code-word of 15 bits), or the like can be used. The output data of the digital modulating circuit 9 is selectively supplied to sync adding circuits 10a and 10b through a switch circuit 5b.

The sync adding circuit 10a and 10b add a sync signal (a sector sync, an additional sync S1, a C1 sync S2, and a block sync) to the modulated data. As will be described later, in the embodiment, a sector format can be identified with a pattern of an added sync. The sync adding circuit 10a adds a sync corresponding to the 2 kbyte sector format to the data. On the other hand, the sync adding circuit 10b adds a sync corresponding to the CD sector format to the data. These syncs have a special bit pattern so that they are not present in the modulated data.

The output data of the sync adding circuits 10a and 10b is supplied to an optical pickup 12 through a driver 11. The output data is recorded on the optical disc 2 by the magneto-optical recording method or the phase change recording method. The optical disc 2 is rotated by a spindle motor 13 at CLV (constant linear velocity) or CAV (constant angular velocity). The minimum unit of data recorded/reproduced by the optical pickup 12 is one block of data.

Figure 12A:
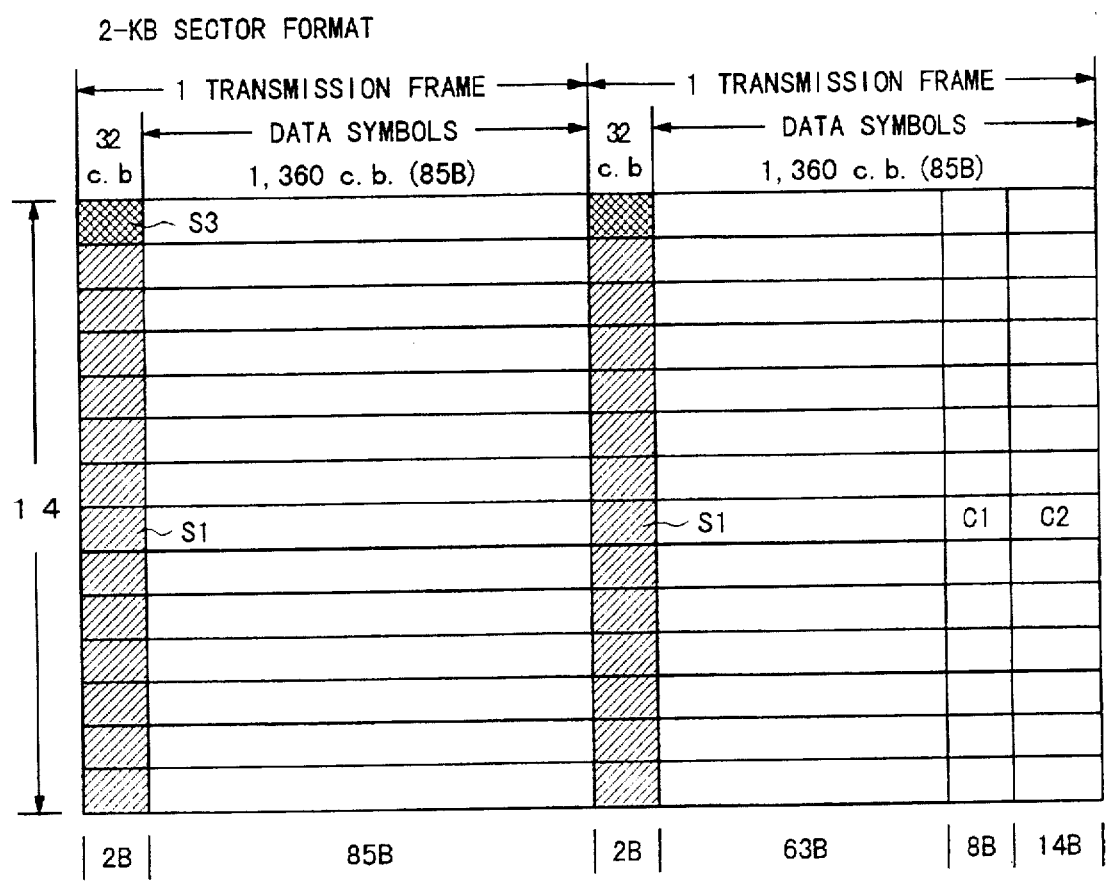
FIGS. 12A and 12B are schematic diagrams showing an example of a structure of transmission data of one sector according to an embodiment of the present invention.

Next, with reference to FIGS. 12A and 12B, record data that is output from the sync adding circuits 10a and 10b will be described. FIG. 12A shows record data of the 2 kbyte sector format. As shown in FIG. 12A, one sector (2,072 bytes) is divided every 148 bytes of data. A parity P (eight bytes) and a parity Q (14 bytes) are added to the data by the folding type dual code encoding process. Thus, (148+22= 170) data symbols are generated. These data symbols are divided into 85 data symbols. The 85 data symbols are converted into (85×16=1,360) channel-bits by the digital modulating method (8–16 modulating method).

As a frame synchronous signal, a sector sync S3 of 32 channel-bits is added to the top of the modulated data symbols of the first half of the 2 kbyte sector. An additional sync S1 is added to each of the other data symbols. Thus, each transmission frame is composed of (1,360+32=1,392 channel-bits). The additional sync S1 of 32 channel-bits is added to each of the modulated data symbols of the second half of the 2 kbyte sector. Thus, likewise, each transmission frame is formed. As shown in FIG. 12A, (14×2=28) transmission frames compose record data of the 2 kbyte sector. As mentioned above, the sector sync S3 instead of the C1 sync S2 is added to the top of the 28 transmission frames.

Figure 12B:
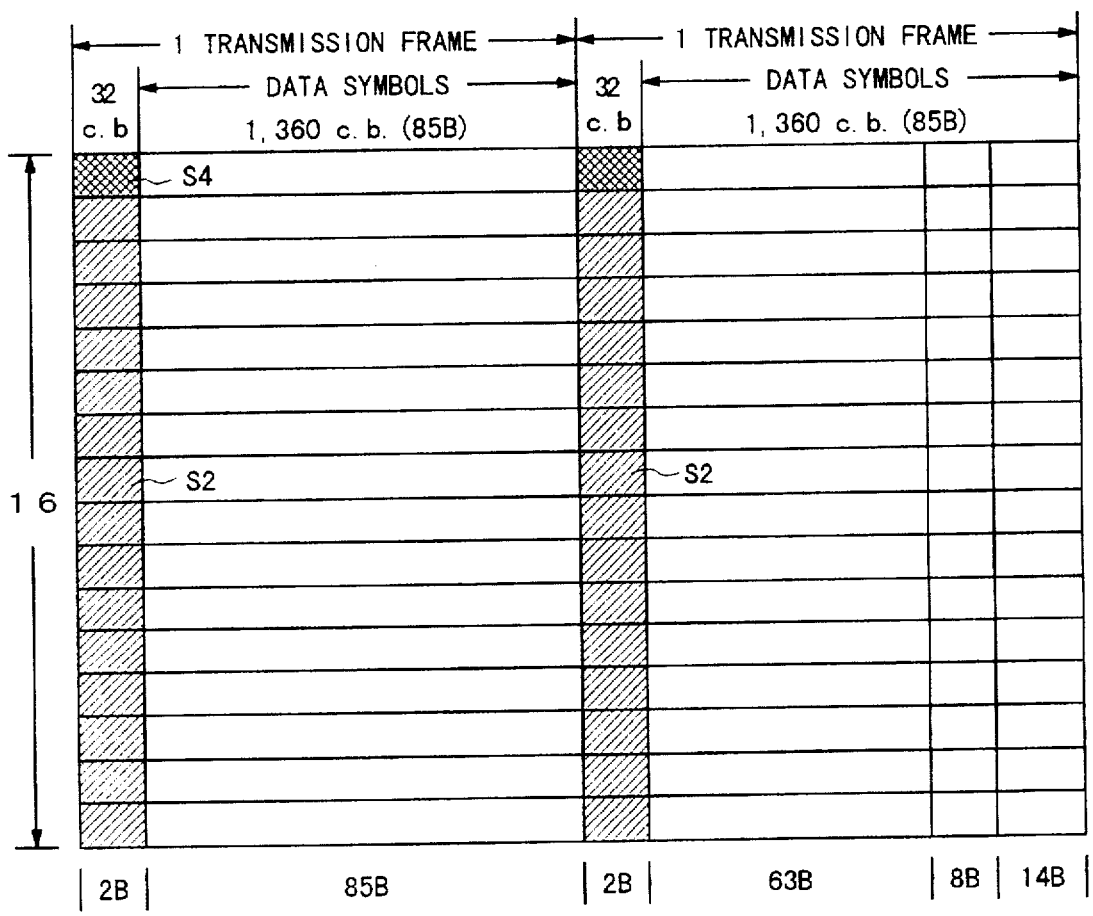

FIG. 12B shows record data of the CD sector format. Record data of 2 kbytes and (16×2=32) transmission frames with the same format compose record data of one sector. A sector sync S4 that represents the CD sector format instead of the sector sync S3 is added to the top of the transmission frames of the CD sector format. In the case of the CD sector format, a frame sync S2 is added to each of the modulated data symbols of the second half of the CD sector format.

Thus, the 2 kbyte sector format and the CD sector format can be identified with the sector syncs S3 and S4, respectively. In addition, these sector formats can be identified with frame syncs (additional sync S1 and C1 sync S2). Thus, the sector format can be identified with only a frame sync rather than a sector sync.

Figure 13A:
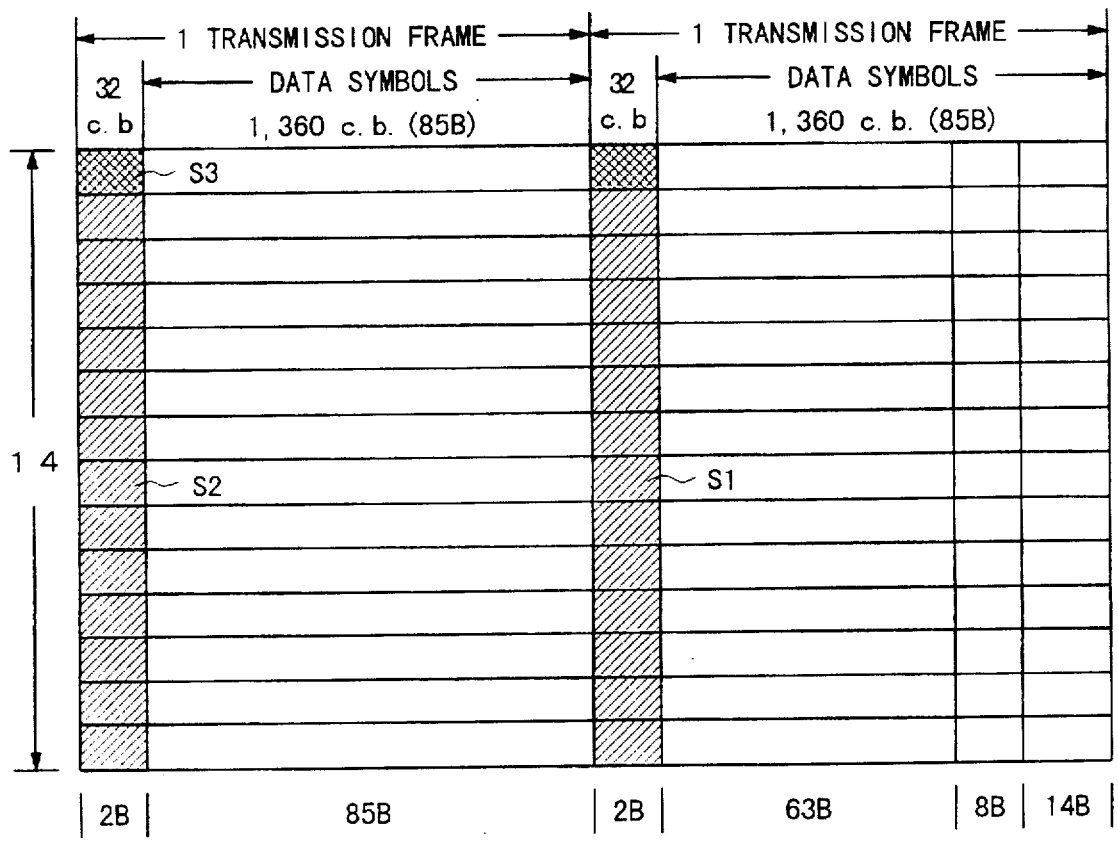
FIGS. 13A and 13B are schematic diagrams showing another example of the structure of transmission data of one sector according to an embodiment of the present invention.
Figure 13B:
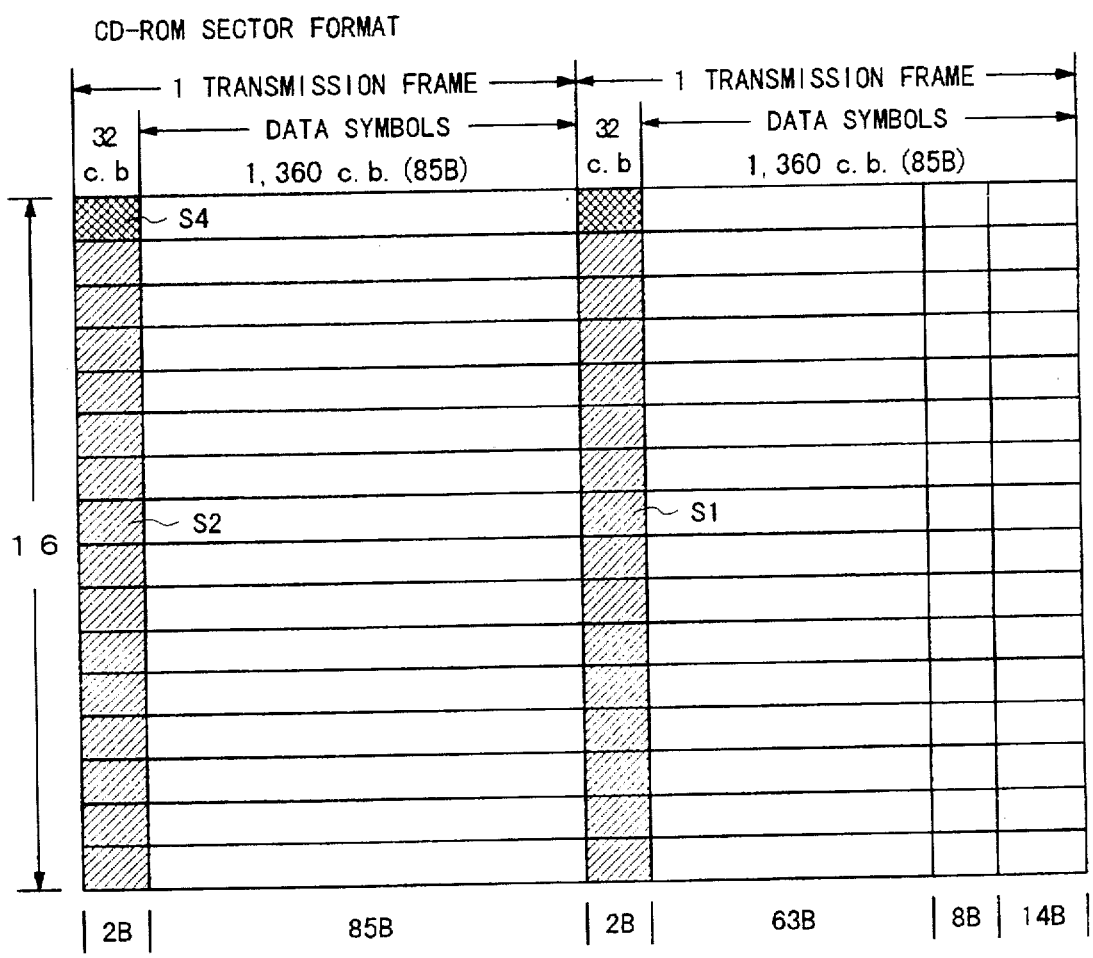

FIGS. 13A and 13B show the case of which a sector format is identified with only a sector sync rather than a frame sync. In other words, in the case of record data of the 2 kbyte sector format, a sector sync S3 is placed at the top of the sector as shown in FIG. 13A. On the other hand, in the case of record data of the CD sector format, a sector sync S4 is placed at the top of the sector as shown in FIG. 13B. At the top of each transmission frame to which the sector sync is not placed, the C1 sync S2 and the additional sync S1 are placed.

As described above, a 2 kbyte sector is composed of 28 transmission frames. On the other hand, a CD sector is composed of 32 transmission frames. Thus, when data is formatted or deformatted, the number of transmission frames is changed between 28 and 32 in synchronization with frames. Consequently, the sectors can be easily managed. In addition, a 1 kbyte sector is composed of 14 transmission frames. A 4 kbyte sector can be composed of 56 transmission frames. A CD sector including a sub-code (the sector length is 2,516 bytes) is composed of 34 frames. Thus, when the number of the transmission frames is changed among 14, 56, and 34, the desired sector format can be used. In particular, when the error correction code encoding process for CDs and folding type (successive type) error correction code encoding process (that will be described later) are used, a plurality of sector sizes can be used by managing only the number of transmission frames.

Figure 14:
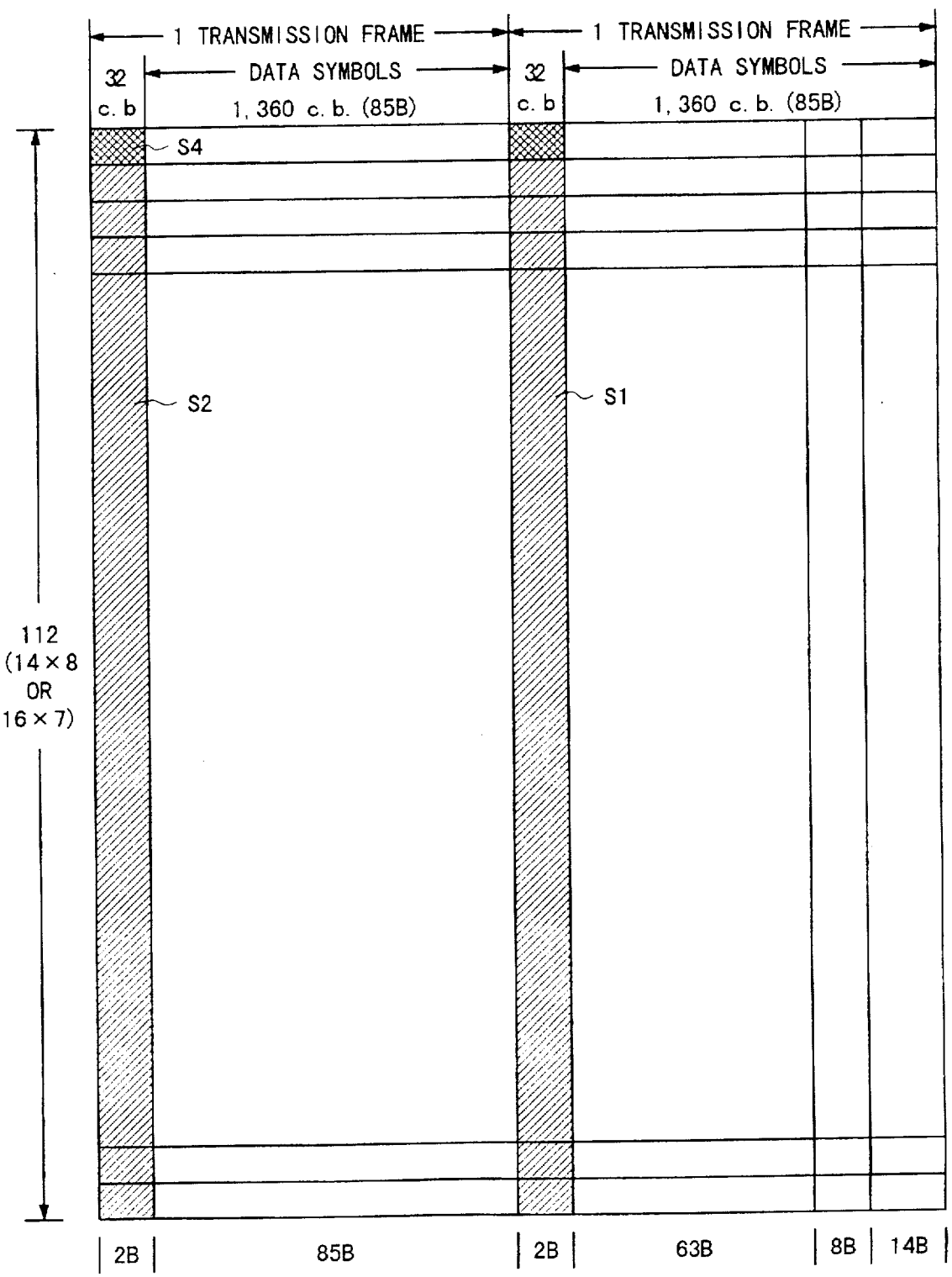
FIG. 14 is a schematic diagram showing an example of a structure of data transmission of one block according to an embodiment of the present invention.

FIG. 14 is a schematic diagram for explaining a method for adding a block sync S5. As described above, one block is composed of eight 2 kbyte sectors or seven CD sectors. Thus, the block sync S5 instead of the sector sync S3 or S4 is placed at the top transmission frame of the top sector of the block. The sector sync S3 or S4 is placed to the top transmission frame of each of the other sectors. The block sync S5 can be placed independent from the sector sync. Alternatively, the block sync may be omitted. By counting the number of the sector syncs, the delimitation of the block can be detected.

Figure 15:
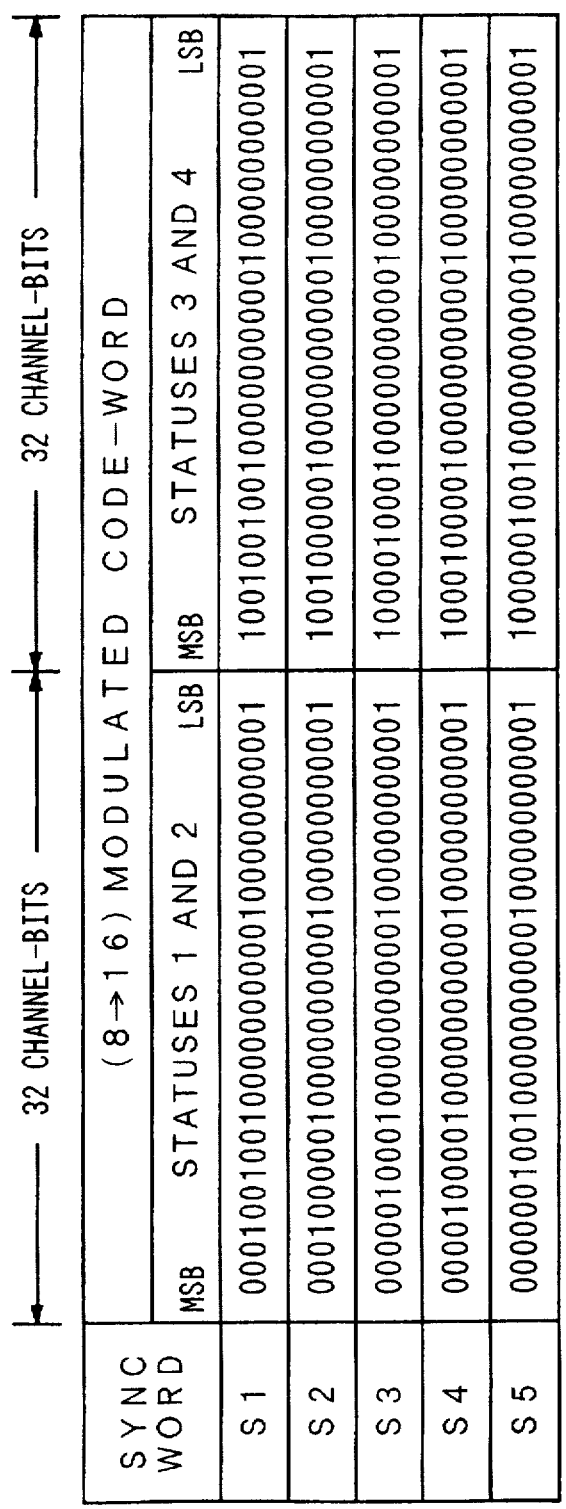
FIG. 15 is a schematic diagram showing bit patterns of a sector sync, a frame sync, and a block sync according to an embodiment of the present invention.

FIG. 15 shows a practical bit pattern of a frame synchronous signal in the case that the (8–16) modulating method (referred to as the EFM plus method) is used as a digital modulating method. States 1, 2, 3, and 4 are defined in the (8–16) modulating method. In FIG. 15, bit patterns of syncs of the states 1 and 2 and bit patterns of syncs of the states 3 and 4 are separately defined. When the most significant bit (MSB) is "0", the states 1 and 2 are used. When the most significant bit is "1", the states 3 and 4 are used. Data of each bit pattern is placed from the MSB of the transmission frame.

As shown in FIG. 15, the bit patterns of the additional sync S1, the C1 sync S2, the sector syncs S3 and S4, and the block sync S5 are different from each other. In addition, these bit patterns do not appear in a code-word sequence of which data symbols have been modulated. A sync word is identified by a pattern containing two sequences of which the interval of inverted channel-bits is 11T (where T is a bit cell of a channel-bit).

Next, with reference to FIG. 2, a reproducing circuit for an optical disc 2 on which data has been recorded in the above-described manner will be described. Data is recorded on the disc 2 in the 2 kbyte sector format or the CD-ROM sector format. As will be described later, data in both the 2 kbyte sector format and the CD-ROM sector format may be recorded on a single optical disc. The sector formats can be identified by the sync pattern and the ID signal in the header of each sector. In FIG. 2, an optical disc 2, an optical pickup 12, and a spindle motor 13 are denoted by the same reference numerals as those in the recording circuit (shown in FIG. 1). However, it should be noted that the recording operation and the reproducing operation are not performed by a single unit. In particular, when a read-only disc is used, the recording apparatus shown in FIG. 1 is a mastering system, whereas the reproducing apparatus shown in FIG. 2 is a disc drive.

Reproduced data read from the optical pickup 12 is supplied to a PLL circuit 22 that extracts a clock through an RF amplifier 21. On each of the recording side and the reproducing side, a servo control circuit (not shown) that controls the focus servo operation, the tracking servo operation, the seek operation, the laser power for the recording operation, and so forth is disposed. The output data of the PLL circuit 22 is supplied to a sync separating circuit 23. The sync separating circuit 23 generates a sync detection signal corresponding to a frame sync, a sector sync, and a block sync.

The sync detection signal is supplied to an ID signal generating circuit 24. The ID signal generating circuit 24 checks the bit pattern of the frame synchronous signal of the reproduced data and generates a sync ID signal corresponding to the sector format of the reproduced data. The sync detection signal is supplied to a timing generating circuit (not shown). The timing circuit generates various timing signals that synchronize with sectors and blocks of the reproduced data.

The sync separating circuit 23 is connected to a digital demodulating circuit 25. The digital demodulating circuit 25 performs the inverse process of the digital modulating circuit 9 shown in FIG. 1 and generates data of which code-words have been restored to data symbols. The output data of the digital demodulating circuit 25 is supplied to an error correction code decoder 26. The decoder 26 corrects an error of the reproduced data. The decoder 26 performs a folding type dual code decoding process for the reproduced data corresponding to the C1 encoder 8 and the C2 encoder 7 on the recording side shown in FIG. 1.

The decoded output data of the decoder 26 is supplied to a block desegmenting circuit 27. The block desegmenting circuit 27 performs the inversed process of the block segmenting circuit 6 on the recording side shown in FIG. 1 and outputs data in a sector format. The block desegmenting circuit 27 is connected to a header identifying circuit 28 and a switch circuit 29. The switch circuit 29 selectively supplies the output data of the block desegmenting circuit 27 to deformatting circuits 30a and 30b.

The header identifying circuit 28 identifies the information of the header of each sector. In other words, the header identifying circuit 28 identifies whether or not each sector is the 2 kbyte sector format or the CD sector format corresponding to the sector ID signal placed in for example auxiliary data (AUX). In this case, the sync ID signal is also supplied to the header identifying circuit 28. The header identifying circuit 28 generates a control signal corresponding to both the sector ID signal and the sync ID signal. The sync ID signal is obtained before the digital demodulating operation is performed. Thus, the sector format can be easily identified. With the sector ID signal, the sector format of each sector can be identified. In addition, with both the sector ID signal and the sync ID signal, the sector format can be identified with a high reliability.

The switch circuit 29 is controlled with the control signal supplied from the header identifying circuit 28. In other words, when the reproduced data is of the 2 kbyte sector format, the switch circuit 29 selects the deformatting circuit 30a. When the reproduced data is of the CD sector format, the switch circuit 29 selects the deformatting circuit 30b.

The deformatting circuit 30a performs the inversed process of the formatting circuit 4a on the recording side shown in FIG. 1. On the other hand, the deformatting circuit 30b performs the inversed process of the formatting circuit 4b. The deformatting circuit 30a extracts user data of 2,048 bytes from each 2 kbyte sector. The deformatting circuit 30b extracts user data of 2,336 bytes or the like from each CD sector. The user data extracted by the deformatting circuit 30a or 30b is supplied to an interface 31. The interface 31 supplies the reproduced data to an output terminal 32.

Figure 16:
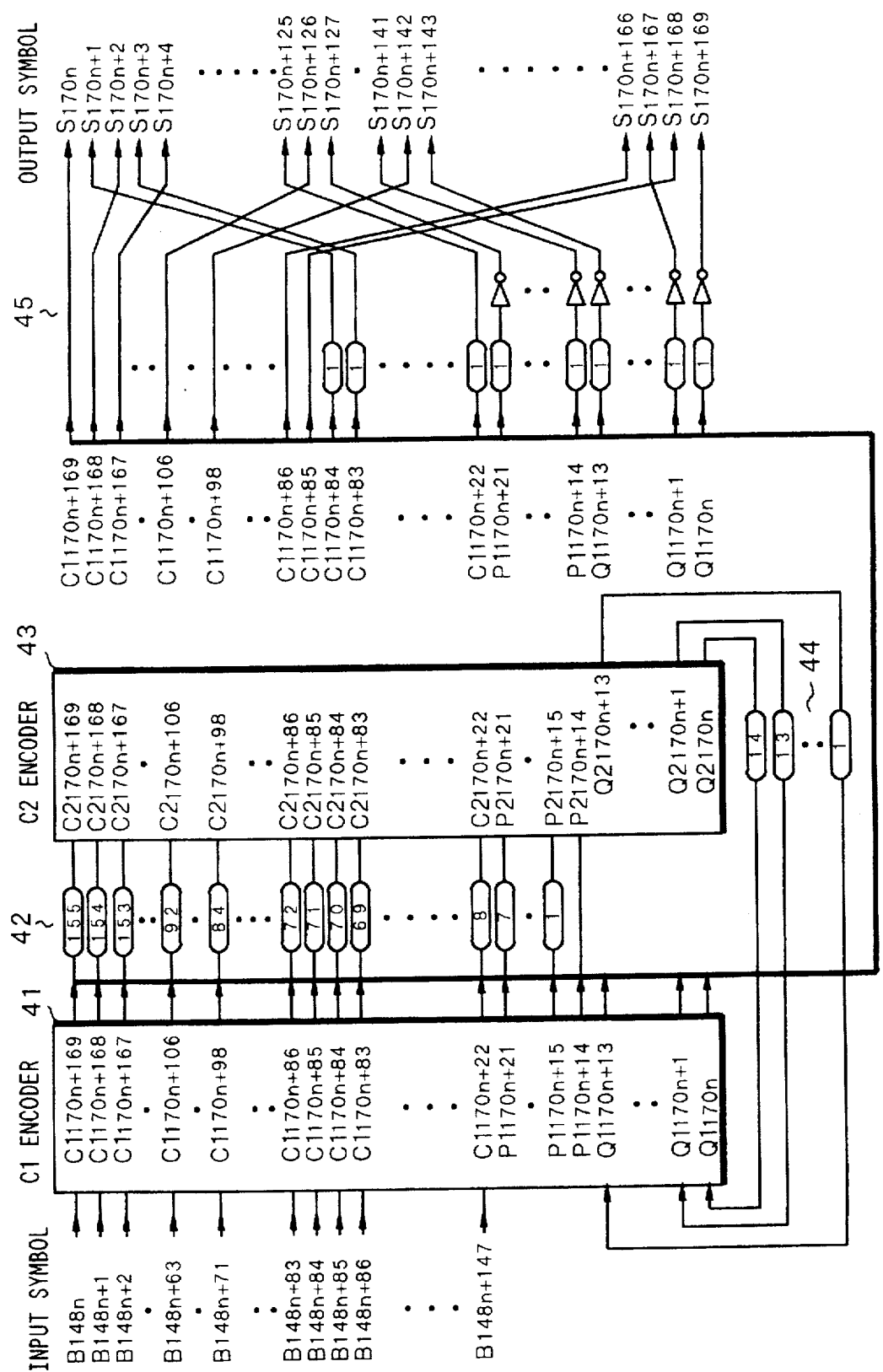
FIG. 16 is a block diagram showing an example of a process of a folding type error correction code encoder according to an embodiment of the present invention.

Next, an example of the error correction code encoding process according to the embodiment of the present invention will be described. FIG. 16 is a block diagram showing an error correction code encoding process performed by the error correction code encoder 8. The error correction code is similar to the cross interleave Reed-Solomon code used for a CD (this code is used in the folding type dual code encoding process).

Input symbols of 148 bytes are supplied to a C1 encoder 41. The output data of the C1 encoder 41 (data symbols of 148 bytes and a C1 parity P of 8 bytes) is supplied to a C2 encoder 43 through a delaying circuit group 42. The C2 encoder 43 performs an encoding process with the [170, 156, 15] Reed-Solomon code and generates a C2 parity Q of 14 bytes. The C1 encoder 41 performs an encoding process for not only data, but parity Q with a C1 code. Thus, the C2 encoder 43 feeds back the C2 parity Q to the C1 encoder 41 from the C2 encoder 43 through the delaying circuit group 42a. Consequently, the C1encoder 41 performs an encoding process with the [170, 162, 9] Reed-Solomon code.

170 bytes (data of 148 bytes, a C1 parity of 8 bytes, and a C2 parity of 14 bytes) received from the C1 encoder 41 are extracted as output symbols through an array changing circuit 45 including a delaying circuit. The output symbols are supplied to the digital modulating circuit 18. The interleave length of the folding type dual code encoding process is 170 frames corresponding to the maximum delay amount of the delaying circuit. (In this case, the frame represents the length of the C1 code sequence and is equivalent to two frames of the above-described transmission frames). The interleave length is also referred to as the restriction length of the interleave or the depth of the interleave.

Figure 17:
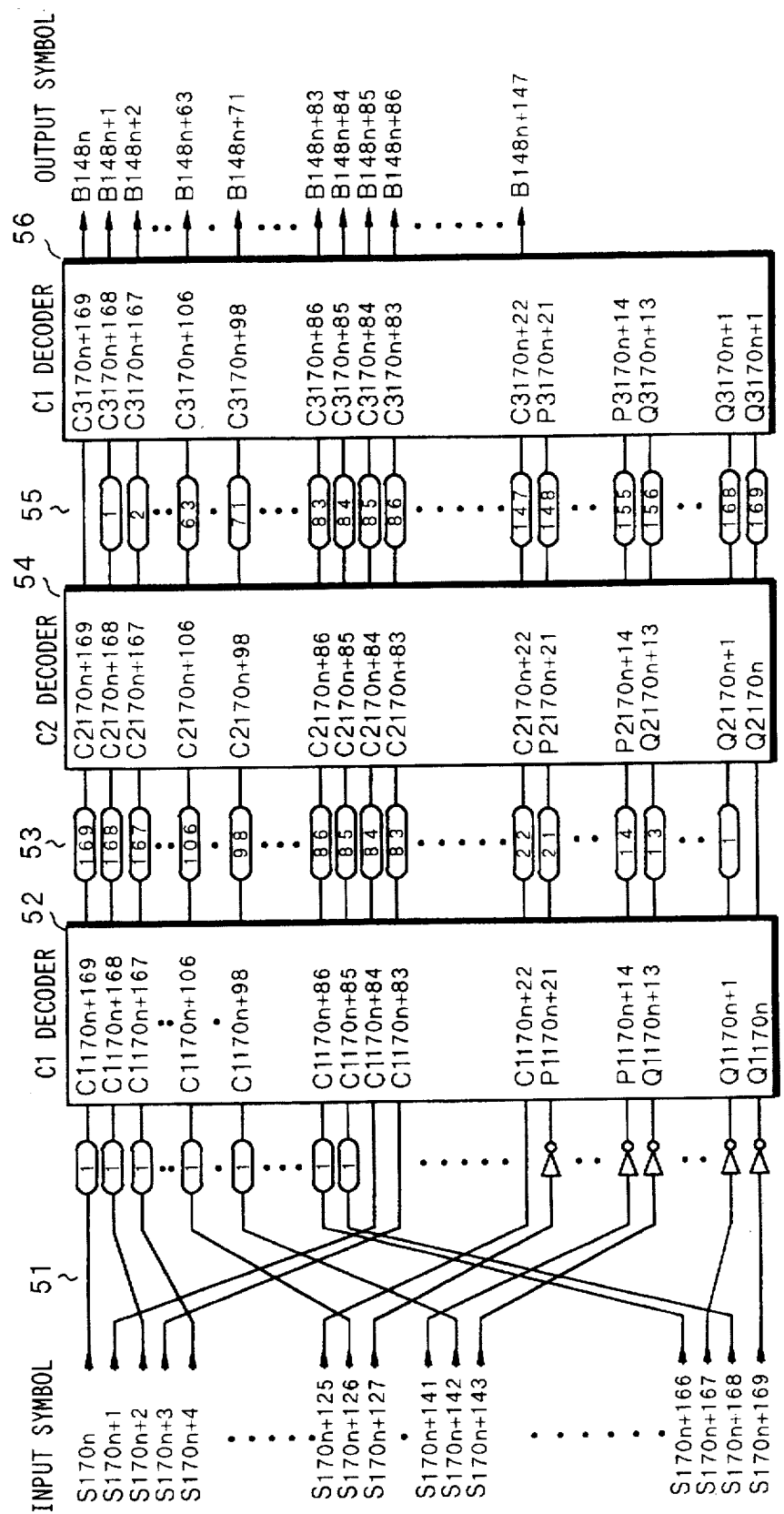
FIG. 17 is a block diagram showing an example of a process of a folding type error correction code decoder according to an embodiment of the present invention.

Next, with reference to FIG. 17, the process of the decoder corresponding to the encoder shown in FIG. 16 will be described. The input symbols (of 170 bytes) are supplied from a digital demodulating circuit 25 to a C1 decoder 52 through an array changing circuit 51. The array changing circuit 51 performs the inversed process of the array changing circuit 44 of the encoder. The C1 decoder 52 performs a decoding process with the [170, 162, 9] Reed-Solomon code.

The output data of the C1 decoder 52 is supplied to a C2 decoder 54 through a delaying circuit group 53. The C2 decoder 54 performs a decoding process with the [170, 156, 15] Reed-Solomon code. The decoded output data of the C2 decoder 54 is supplied to a C1 decoder 56 through a deinterleave delaying circuit 55. Thus, output symbols of 148 bytes that have been error-corrected by the C1 decoding process, the C2 decoding process, and the C1 decoding process are extracted.

As the error correction code encoding process, a block completion type encoding process of which the error correction code encoding process is completed for every a predetermined unit can be used along with the folding type error correction code encoding process. However, when two sector formats are present on a single disc, since the folding type encoding process successively records data, it is superior to the block completion type encoding process.

Next, a second embodiment of the present invention will be described. In the second embodiment, with the data sync (4 bytes) shown in FIGS. 6A and 7A, a plurality of data formats are identified and the top of each block is detected.

Figure 18:
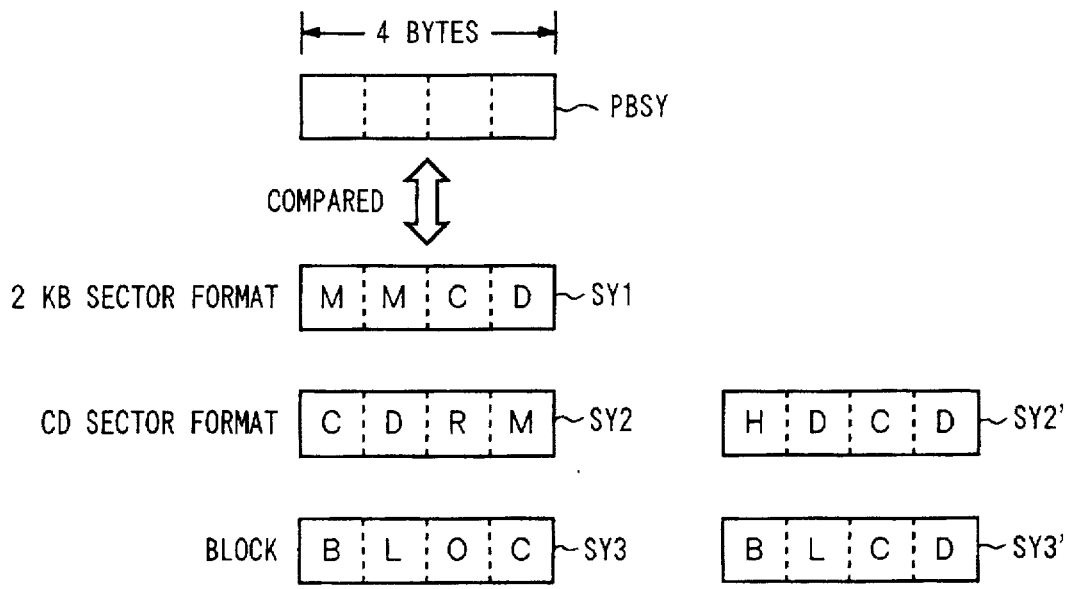
FIG. 18 is a schematic diagram showing an example of a structure of a data sync according to an embodiment of the present invention.

FIG. 18 is a schematic diagram for explaining an example of a data sync. The data sync (4 bytes) of the reproduced data is compared with predetermined data sync patterns SY1, SY2, and SY3. As the data sync patterns, character codes defined in for example ISO 646 can be used. FIG. 18 shows characters of the predetermined data sync patterns. For the 2 kbyte sector format, "MMCD" is used as the data sync pattern SY1. For the CD sector format, "CDRM" is used as the data sync pattern SY2. For a data sync at the beginning of each block, "BLOC" is used as the data sync pattern SY3. By determining whether the data sync PBSY of each sector accords with these data sync patterns, the sector format can be detected. In addition, with the data sync, the top of each sector and each block can be detected.

In the real example shown in FIG. 18, since the characters of the data sync patterns differ from each other, the sector format can be correctly detected. However, as in SY2' (="HDCD") and SY3' (="BLCD"), data sync patterns whose characters partially differ from each other may be used.

Figure 19A:
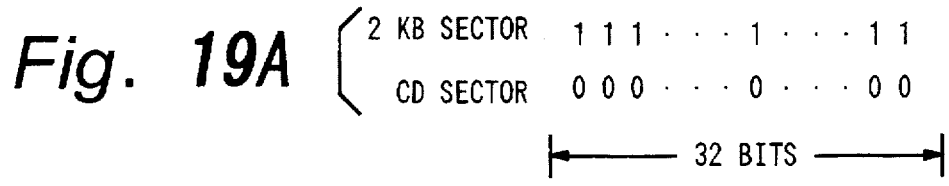
FIGS. 19A, 19B and 19C are schematic diagrams showing another example of a structure of a data sync according to an embodiment of the present invention.
Figure 19B:
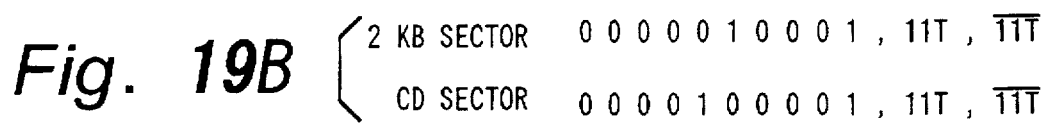
Figure 19C:
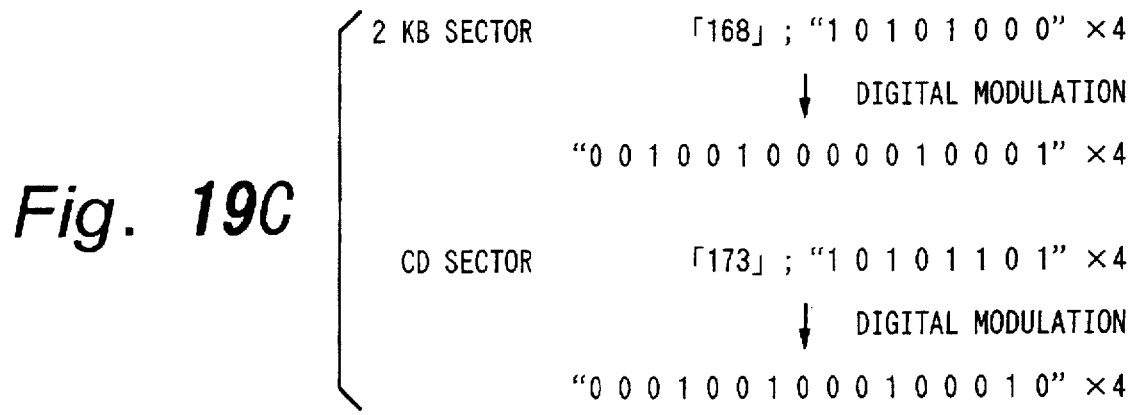

FIGS. 19A, 19B, and 19C show examples of data sync patterns. FIG. 19A shows the case of which all "1s" are assigned to the data sync pattern for the 2 kbyte sector format and all ")s" are assigned to the data sync pattern for the CD sector format. In this case, the distance between two bit patterns becomes maximum.

FIG. 19B shows the case of which the same pattern (32 bits) of the sync pattern as that added after the digital modulation is performed is used. For example, the sync pattern S3 (="0000010001, 11T, 11T (inverted)" (where 11T represents an interval of inverted channel-bits (T represents a period of a channel-bit)) is allocated to the data sync pattern for the 2 kbyte sector format. The sync pattern S4 (="0000100001, 11T, 11T (inverted)") is allocated to the data sync pattern for the CD sector format. In this case, the bit pattern can be shared with the frame sync.

FIG. 19C shows the case of which a data sync of which a binary code (for example, "168" (="10101000")) is repeated four times is placed for the 2 kbyte sector format, whereas a data sync of which a binary code (for example, "173" (="10101101") is repeated four times is placed for the CD sector format. When the data sync for the 2 kbyte sector format is digitally modulated, a pattern "0010010000010001" is repeated four times. On the other hand, when the data sync for the CD sector format is digitally modulated, a pattern "0001001000100010" is repeated four times. Thus, since the distance between the bit patterns of the two data syncs that have been digitally modulated becomes large, the bit patterns can be prevented from being incorrectly identified due to a transmission error.

Next, returning to FIG. 1, a recording system according to the second embodiment will be described. For simplicity, the description of similar portions to those of the first embodiment is omitted.

A formatting circuit 4a converts the received data into data of the 2 kbyte sector format as shown in FIG. 6A and adds the above-described data sync pattern SY1 (that represents the 2 kbyte sector format) as a data sync to each sector. A formatting circuit 4b converts the received data into data of the CD sector format as shown in FIG. 7A and adds the above-described data sync pattern SY2 (that represents the CD sector format) as a data sync to each sector. FIGS. 18, 19A, 19B, and 19C show other examples of data sync patterns. The sector formatted data as the output data of the formatting circuit 4a or 4b is supplied to a block segmenting circuit 6.

The block segmenting circuit 6 forms a block composed of seven sectors or eight sectors shown in FIGS. 9A and 9B corresponding to an ID signal. At this point, to identify the top sector of each block, the data sync pattern SY1 and SY2 of the top sector of each block is substituted with a data sync pattern SY3 shown in FIG. 18. Data of each block is supplied from the block segmenting circuit 6 to a C2 encoder 7 and a C1 encoder 8 (that are the same as those described in the first embodiment). The C2 encoder 7 and the C1 encoder 8 add a C2 parity and a C1 parity for error corrections to each block, respectively.

Figure 20:
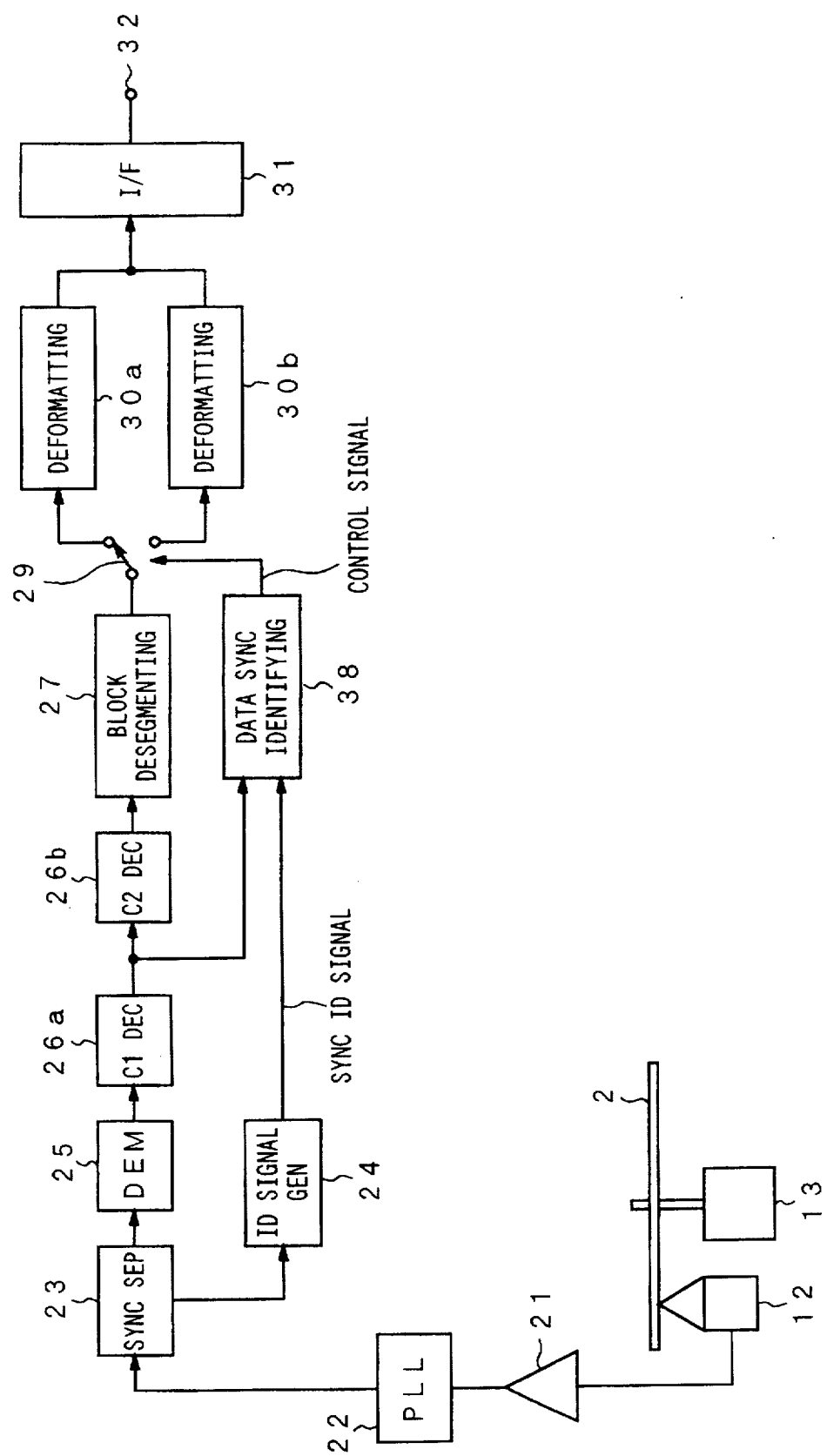
FIG. 20 is a block diagram showing a structure of a reproducing circuit according to another embodiment of the present invention.

Next, with reference to FIG. 20, a reproducing system according to the second embodiment of the present invention will be described. Likewise, for simplicity, the description of similar portions to those of the first embodiment is omitted.

Reproduction data read from an optical pickup 12 is supplied to a clock extracting PLL circuit 22 through an RF amplifier 21.

Reproduced data read from the optical pickup 12 is supplied to a PLL circuit 22 that extracts a clock through an RF amplifier 21. On each of the recording side and the reproducing side, a servo control circuit (not shown) that controls the focus servo operation, the tracking servo operation, the seek operation, the laser power for the recording operation, and so forth is disposed. The output data of the PLL circuit 22 is supplied to a sync separating circuit 23. The sync separating circuit 23 generates a sync detection signal corresponding to a frame sync, a sector sync, and a block sync shown in FIG. 15.

The sync detection signal is supplied to an ID signal generating circuit 24. The ID signal generating circuit 24 checks the bit pattern of the frame synchronous signal of the reproduced data and generates a sync ID signal corresponding to the sector format of the reproduced data. The sync detection signal is supplied to a timing generating circuit (not shown). The timing circuit generates various timing signals that synchronize with sectors and blocks of the reproduced data.

The sync separating circuit 23 is connected to a digital demodulating circuit 25. The digital demodulating circuit 25 performs the inverse process of the digital modulating circuit 9 shown in FIG. 1 and generates data of which code-words have been restored to data symbols. The output data of the digital demodulating circuit 25 is supplied to an error correction code C1 decoder 26a and an error correction code C2 decoder 26b. The C1 decoder 26a and the C2 decoder 26b correct an error of the reproduced data. The C1 decoder 26a and the C2 decoder 26b perform folding type dual code decoding processes for the reproduced data corresponding to the C2 encoder 7 and the C1 encoder 8 on the recording side shown in FIG. 1.

The decoded output data of the C2 decoder 26b is supplied to a block desegmenting circuit 27. The block desegmenting circuit 27 performs the inversed process of the block segmenting circuit 6 on the recording side shown in FIG. 1 and outputs data in a sector format. The C1 decoder 26a is connected to a data sync identifying circuit 28. The block desegmenting circuit 27 is connected to a switch circuit 29. The switch circuit 29 selectively supplies the output data of the block desegmenting circuit 27 to deformatting circuits 30a and 30b.

The data sync identifying circuit 38 identifies the information of the data sync of each sector. As described above, the data sync identifying circuit 38 detects whether or not the data sync extracted from the reproduced data accords with the predetermined data sync patterns so as to determine whether the sector is of the 2 kbyte sector format or of the CD sector format. In this case, the sync ID signal is also supplied to the data sync identifying circuit 38. The data sync identifying circuit 38 generates a control signal corresponding to both the sector ID signal and the sync ID signal. The sync ID signal is obtained before the digital demodulating operation is performed. Thus, the sector format can be easily identified. With the sector ID signal, the sector format of each sector can be identified. In addition, with both the sector ID signal and the sync ID signal, the sector format can be identified with a high reliability.

The switch circuit 29 is controlled with the control signal supplied from the data sync identifying circuit 38. In other words, when the reproduced data is of the 2 kbyte sector format, the switch circuit 29 selects the deformatting circuit 30a. When the reproduced data is of the CD sector format, the switch circuit 29 selects the deformatting circuit 30b.

The deformatting circuit 30a performs the inverse process of the formatting circuit 4a on the recording side shown in FIG. 1. On the other hand, the deformatting circuit 30b performs the inverse process of the formatting circuit 4b. The deformatting circuit 30a extracts user data of 2,048 bytes from each 2 kbyte sector. The deformatting circuit 30b extracts user data of 2,336 bytes or the like from each CD sector. The user data extracted by the deformatting circuit 30a or 30b is supplied to an interface 31. The interface 31 supplies the reproduced data to an output terminal 32. Unlike with the first embodiment, the data sync may be extracted from the output data of the digital demodulating circuit 25. Alternatively, the data sync may be extracted from the output data of the C2 decoder 26b. The extracted data sync is supplied to the data sync identifying circuit 38.

Figure 21A:
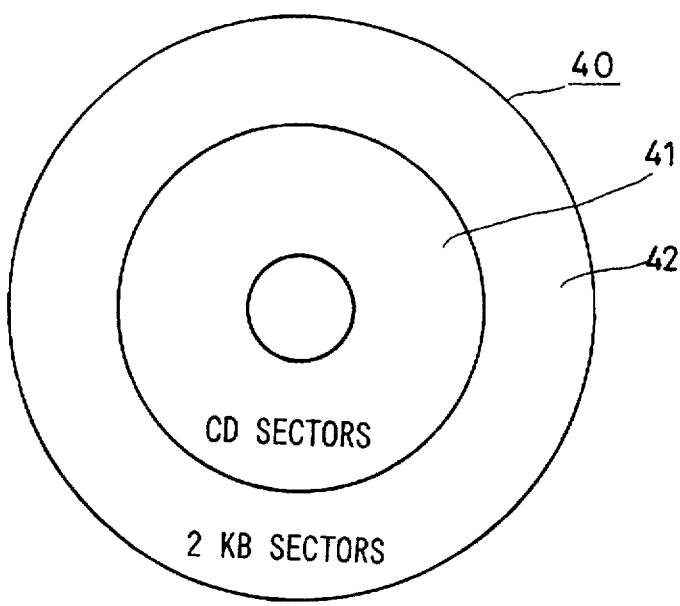
FIGS. 21A, 21B, 21C, 21D, and 21E are schematic diagrams for explaining applications of the present invention.

In the above-described embodiments, one optical disc has one sector format. However, according to the present invention, one optical disc can have two sector formats. Several examples will be described with reference to FIGS. 21A, 21B, 21C, 21D, and 21E. In FIG. 21A, the record region of an optical disc 40 is divided into a zone 41 and a zone 42. Data of a particular sector format and data of another sector format are separately recorded on respective zones. In an example shown in FIG. 21A, data recorded in the zone 41 has the CD sector format, whereas data recorded in the zone 42 has the 2 kbyte sector format.

Figure 21B:
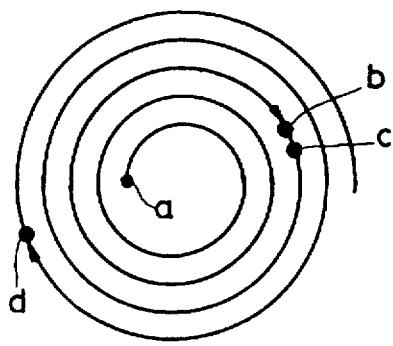

FIG. 21B shows an example of which files have different sector formats. In other words, the record region is divided into file record regions. Data of a particular sector format and data of another sector format are separately recorded in respective file record regions. In FIG. 21B, for example, a file record region from portion a to portion b has the 2 kbyte sector format, whereas another file record region from portion c to portion d has the CD sector format.

Figure 21C:
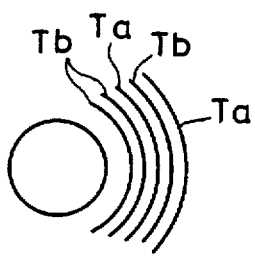

FIG. 21C shows an example of which tracks have different sector formats. For example, data recorded on a track Ta has the 2 kbyte sector format, whereas data recorded on a track Tb has the CD sector format.

Figure 21D:
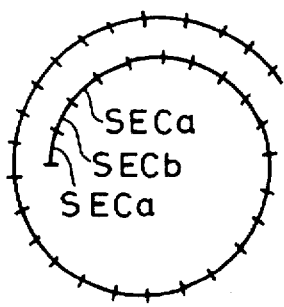

FIG. 21D shows an example of which sectors have different sector formats. In other words, the record region is divided into sector record regions. Data of a particular sector format and data of another sector format are separately recorded in respective sector record regions. For example, data recorded in a sector SECa has the 2 kbyte format, whereas data recorded in a sector SECb has the CD sector format.

Figure 21E:
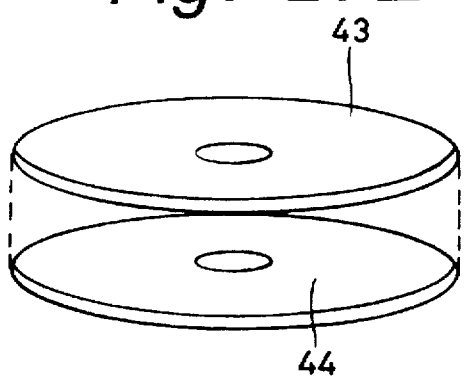

Moreover, to increase the storage capacity of an optical disc, a single-sided multiple-layered disc and a double-sided multiple-layered disc have been proposed. A single-sided two-layered disc has a record layer 43 and a record layer 44 as shown in FIG. 21E. Data on the record layers 43 and 44 is read from one surface. For example, data of the CD sector format is recorded on the record layer 43, whereas data of the 2 kbyte sector format is recorded on the record layer 44. In the case of a double-sided multiple-layered disc, likewise, data of a different sector format can be recorded on each record surface.

As described above, according to the present invention, data of a multiple of 512 bytes (for example data of the 2 kbyte sector format) and data of the CD sector format corresponding to the CD format can be used in physical regions. With a single data storage medium, both software data for a computer and software resources for a CD-ROM can be handled.

In addition, according to the present invention, since the error correction code encoding/decoding processes and digital modulating/demodulating processes can be commonly used for two types of sector formats, the hardware scale can be reduced. Moreover, software data for a computer and software resources for a CD-ROM can be handled on a single record medium.

Furthermore, according to the present invention, since each of the sector formats accords with a multiple of the number of frames of transmission data, data can be easily formatted and deformatted in synchronization with the frames.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A data recording apparatus for recording digital data on a data record medium, comprising:
   input means for receiving first data of which data is divided by a length of a multiple of 512 bytes and second data of which data is divided by a byte length corresponding to a CD format;
   formatting means for converting each of the first data and the second data into a sector format and producing output data;
   encoding means for error-correction-code encoding said output data of said formatting means;
   modulating means for digitally modulating the data that has been error-correction-code encoded and producing record data; and
   recording means for recording record data supplied from said modulating means to the data record medium.

2. The data recording apparatus as set forth in claim 1, wherein said formatting means adds a data sync signal to the top of data, when the data is converted into a sector, the data sync signal being used for identifying whether the converted sector accords with a sector composed of the first data or a sector composed of the second data.

3. The data recording apparatus as set forth in claim 2, wherein the data sync signal contained in each of the sector composed of the first data and the sector composed of the second data is used to identify a block as a set of a plurality of sectors.

4. The data recording apparatus as set forth in claim 2, wherein the data sync signal is composed of a pattern that represents a plurality of character codes, and
   wherein said formatting means allocates character codes to the data sync signals added to the first data and the second data so that the character codes of the data sync signal added to the first data are at least different from the character codes of the data sync signal added to the second data.

5. The data recording apparatus as set forth in claim 2, wherein said formatting means selects the bit patterns added to the first data and the second data so that the distance therebetween becomes large.

6. The data recording apparatus as set forth in claim 2, wherein the bit patterns added to the first data and the second data are selected so that the distance therebetween becomes large after they are digitally modulated.

7. The data recording apparatus as set forth in claim 2, further comprising:
   block segmenting means for forming a first block with a plurality of sectors composed of the first data and a second block with a plurality of sectors composed of the second data.

8. The data recording apparatus as set forth in claim 7, wherein said block segmenting means substitutes the data sync signal contained at the top sector of each of the first block and the second block with a particular sync signal that represents the top sector of each block.

9. The data recording apparatus as set forth in claim 1, wherein the second data is divided by the length of 2,352 bytes, 2,340 bytes, 2,336 bytes, 2,324 bytes, or 2,450 bytes.

10. The data recording apparatus as set forth in claim 1, wherein the data recorded on the data record medium is composed of a plurality of successive transmission frames, and
    wherein the number of transmission frames of the sector composed of first data is different from the number of transmission frames of the sector composed of the second data.

11. The data recording apparatus as set forth in claim 10, further comprising:
    means for forming the data to be transmitted to the data record medium with the transmission frames and for adding a frame sync signal to the top of the transmission frames, the frame sync signal determining whether the sector of the transmission frames accords with the sector composed of the first data or the sector composed of the second data.

12. The data recording apparatus as set forth in claim 1, wherein said encoding means performs a folding type encoding process for said output data of said formatting means.

13. A data reproducing apparatus for reproducing data from a data record medium, the data having been recorded on the data record medium in such a manner that first data divided by a length of a multiple of 512 bytes and second data divided by a byte length corresponding to a CD format are converted into respective sector formats and that an error-correction code encoding process and a digital modulating process are performed for the sector formatted data, the apparatus comprising:

reproducing means for reproducing the data from the data record medium;

means for digitally demodulating the reproduced data;

decoding means for correcting an error of the demodulated data;

deformatting means for extracting the first data and the second data from the error-corrected data; and means for selectively sending the first data or the second data.

14. The data reproducing apparatus as set forth in claim 13, wherein the second data is divided by the length of 2,352 bytes, 2,340 bytes, 2,336 bytes, 2,324 bytes, or 2,450 bytes.

15. The data reproducing apparatus as set forth in claim 13, wherein the data recorded on the data record medium is composed of a plurality of successive transmission frames, and wherein the number of transmission frames of the sector composed of first data is different from the number of transmission frames of the sector composed of the second data.

16. The data reproducing apparatus as set forth in claim 15, wherein a frame sync signal is added to each of the transmission frames of the data stored on the data record medium, and wherein the apparatus further comprises:

sync signal separating means for detecting the frame sync signal with data reproduced by said reproducing means; and identifying means for identifying whether the data reproduced by said reproducing means is a sector composed of the first data or a sector composed of the second data corresponding to a pattern of the detected frame sync signal.

17. The data reproducing apparatus as set forth in claim 16, wherein part of the sector contains a sector identification signal that represents whether the sector is composed of the first data or the second data, and wherein said identifying means identifies the sector corresponding to both the pattern of the frame sync signal and the sector identification signal.

18. The data reproducing apparatus as set forth in claim 16, wherein said deformatting means extracts the first data or the second data from the error-corrected data corresponding to a control signal supplied from said identifying means.

19. The data reproducing apparatus as set forth in claim 16, wherein the data stored on the data record medium is composed of blocks each of which is composed of a plurality of sectors, wherein each of the sectors contains a data sync signal that represents whether the sector is composed of the first data or the second data, wherein said decoding means corrects an error of each of the blocks, and wherein said identifying means identifies each of the blocks corresponding to the data sync signal.

20. The data reproducing apparatus as set forth in claim 13, wherein said decoding means decodes data of which a folding type encoding process has been performed as the error correction code encoding process.

21. A method for recording digital data on a data record medium, comprising the steps of:

receiving first data divided by a length of a multiple of 512 bytes or second data divided by a byte length corresponding to a CD format;

formatting the received data as sectors composed of the first data or the second data, the formatting step including the step of adding a data sync signal to each of the sectors, the data sync signal being used for identifying whether each of the sectors is composed of the first data or the second data;

block segmenting a plurality of the sectors composed of the first data or the second data;

adding an error correction parity to data as each of the blocks so as to encode the data;

digitally modulating the encoded data; and recording the modulated data on the data record medium.

22. The method as set forth in claim 21, wherein the modulated data is composed of a plurality of successive transmission frames, and wherein the method further comprises the steps of:

adding a frame sync signal to each of the transmission frames; and adding a frame sync signal to a selected one of the transmission frames, the frame sync signal being used for identifying whether the sectors are composed of the first data or the second data.

23. The method as set forth in claim 22, wherein the frame sync signal adding step further comprises the step of:

adding a block sync signal composed of a predetermined bit pattern to the top one of the transmission frames of a top one of the sectors of each of the blocks.

24. The method as set forth in claim 21, wherein the data sync signal is composed of a combination of character codes that are at least partly different from each other.

25. A disc-shaped data record medium for recording first sectors composed of first data divided by a length of a multiple of 512 bytes or second sectors composed of second data divided by a byte length corresponding to a CD format, an error-correction-code encoding process and a digital modulating process having been performed for the first sectors or the second sectors, a header being added to each of the first sectors or the second sectors, the header being used for identifying whether the sector containing the header is the first sector or the second sector.

26. The disc-shaped record medium as set forth in claim 25, wherein at least part of a TOC region is divided by a length of a multiple of 512 bytes.

27. The disc-shaped record medium as set forth in claim 25, wherein a record region is composed of a plurality of record surfaces, a first sector and a second sector being separately recorded on different record surfaces.

28. The disc-shaped record medium as set forth in claim 25, wherein a record region is circumferentially divided into a plurality of zones, a first sector and a second sector being separately recorded on different zones.

29. The disc-shaped data record medium as set forth in claim 25, wherein a record region is divided into a plurality of tracks, a first sector and a second sector being separately recorded on different tracks.

30. The disc-shaped data record medium as set forth in claim 25, wherein a record region is divided into a plurality of file record regions, a first sector and a second sector being separately recorded in different file record regions.

31. The disc-shaped data record medium as set forth in claim 25, wherein a record region is divided into a plurality of blocks each of which is composed of a multiple of sectors, a first sector and a second sector being separately recorded in different block record regions.

32. The disc-shaped data record medium as set forth in claim 25, wherein the number of transmission frames of the first sector is different from the number of transmission frames of the second sector, and wherein a frame sync signal is added to a selected one of the transmission frames, the frame sync signal being used for identifying the first sector or the second sector.

33. The disc-shaped data record medium as set forth in claim 25, wherein the sync signal added to the header is composed of a combination of a plurality of character codes that are at least partly different from each other.

34. The disc-shaped data record medium as set forth in claim 25, wherein the bit pattern of the sync signal added to the header is composed of one of a plurality of bit patterns of which the distance thereof is large.

* * * * *